(12) United States Patent
Lilie et al.

(10) Patent No.: US 7,643,941 B2
(45) Date of Patent: Jan. 5, 2010

(54) CLOUD WATER CHARACTERIZATION SYSTEM

(75) Inventors: Lyle E. Lilie, Ashford, CT (US); Christopher P. Sivo, Ellington, CT (US); Daniel B. Bouley, Columbia, CT (US)

(73) Assignee: Science Engineering Associates, Inc., Mansfield Center, CT (US)

( * ) Notice: Subject to any disclaimer, the term of this patent is extended or adjusted under 35 U.S.C. 154(b) by 375 days.

(21) Appl. No.: 11/329,894

(22) Filed: Jan. 11, 2006

(65) Prior Publication Data

US 2007/0161878 A1 Jul. 12, 2007

(51) Int. Cl.
*G01W 1/02* (2006.01)
*G01W 1/00* (2006.01)

(52) U.S. Cl. .............. 702/3; 702/2; 702/1; 702/50; 73/29.01; 73/335.02

(58) Field of Classification Search .............. 702/3, 702/2, 1, 50
See application file for complete search history.

(56) References Cited

U.S. PATENT DOCUMENTS

| 4,333,004 A * | 6/1982 | Forgue et al. ............... 219/497 |
| 6,377,207 B1 * | 4/2002 | Solheim et al. ............. 342/351 |
| 6,847,903 B2 * | 1/2005 | Severson et al. ............. 702/54 |
| 2005/0251341 A1 * | 11/2005 | Nielsen ......................... 702/3 |

* cited by examiner

*Primary Examiner*—Hal D Wachsman
(74) *Attorney, Agent, or Firm*—Carmody & Torrance LLP

(57) ABSTRACT

A system and method for providing a statistical measure of the size of liquid water droplets in a cloud, as well as a system and method for the detection and/or measurement of the presence of a cloud, liquid water content in the cloud and ice water content in the cloud, among other parameters.

22 Claims, 14 Drawing Sheets

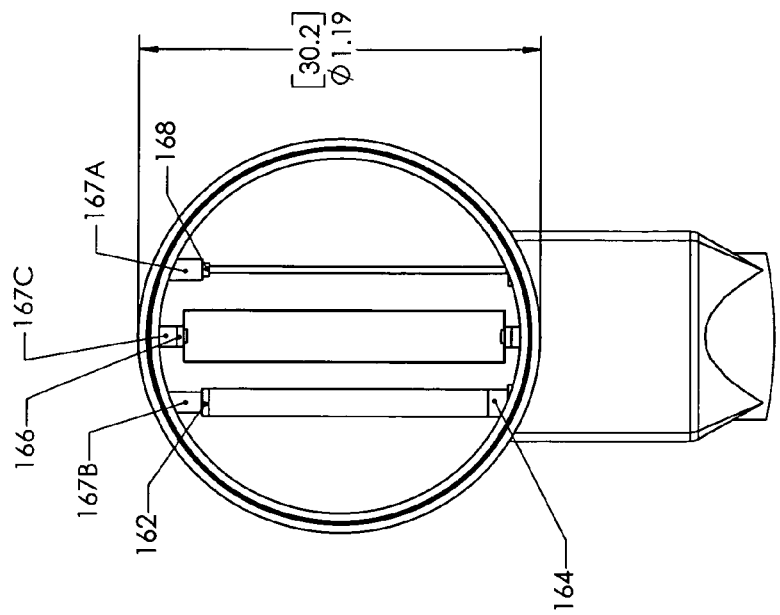
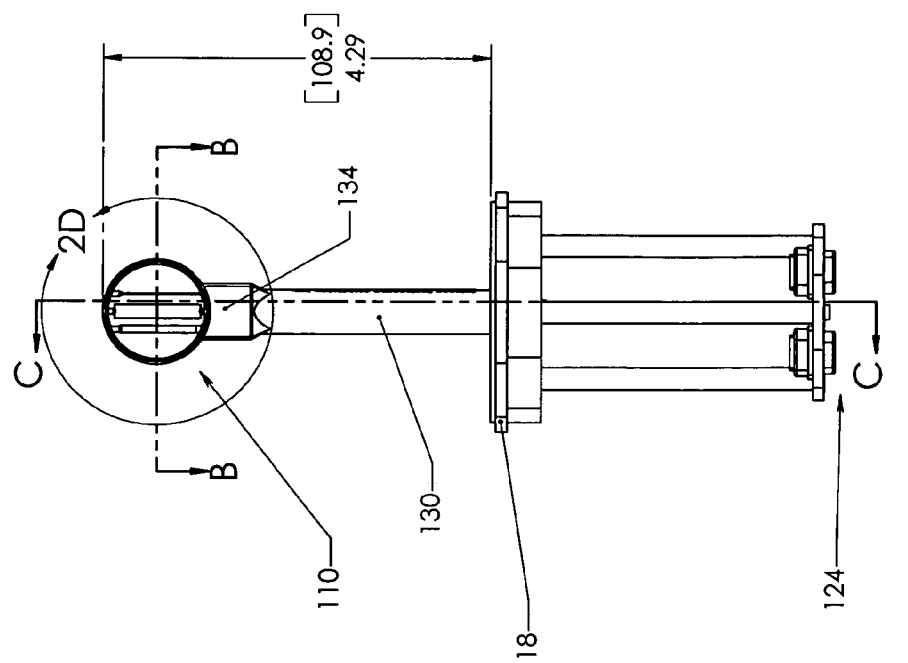
FIG 2D
FIG 2C

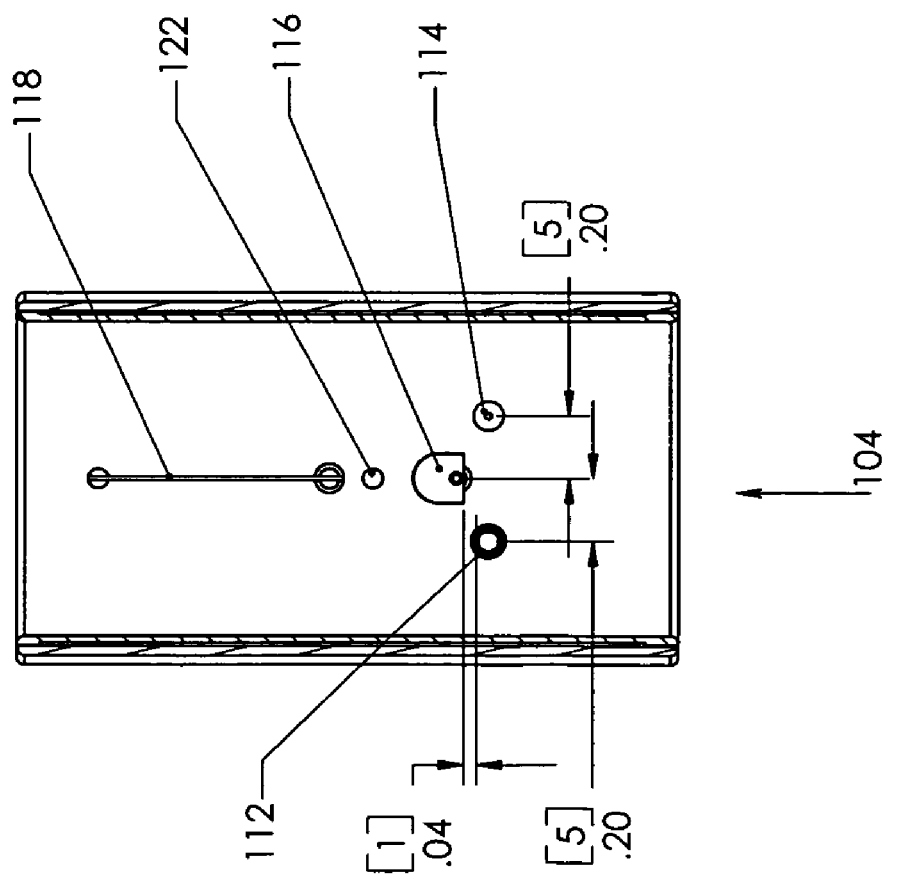

SECTION C-C of FIG 2C

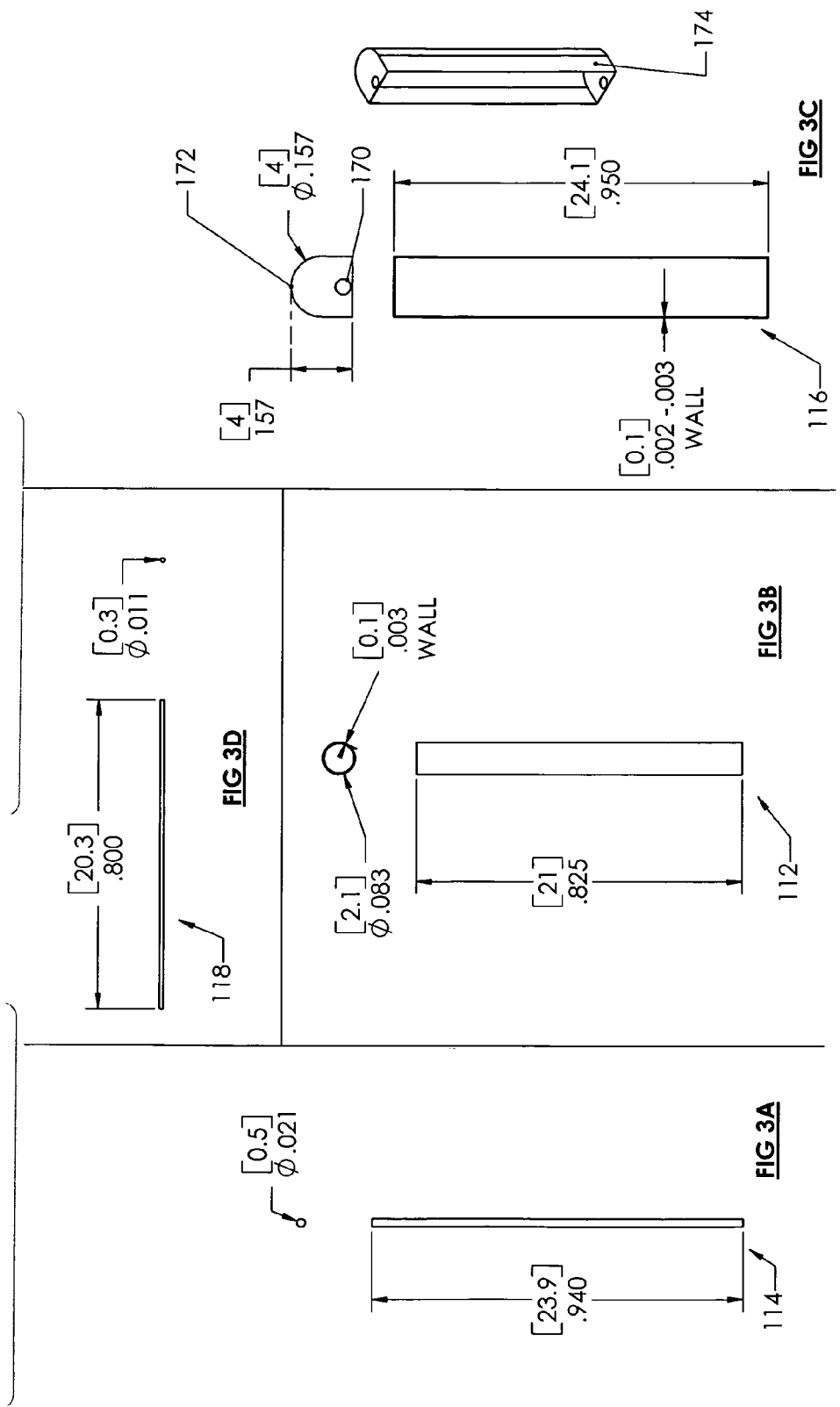

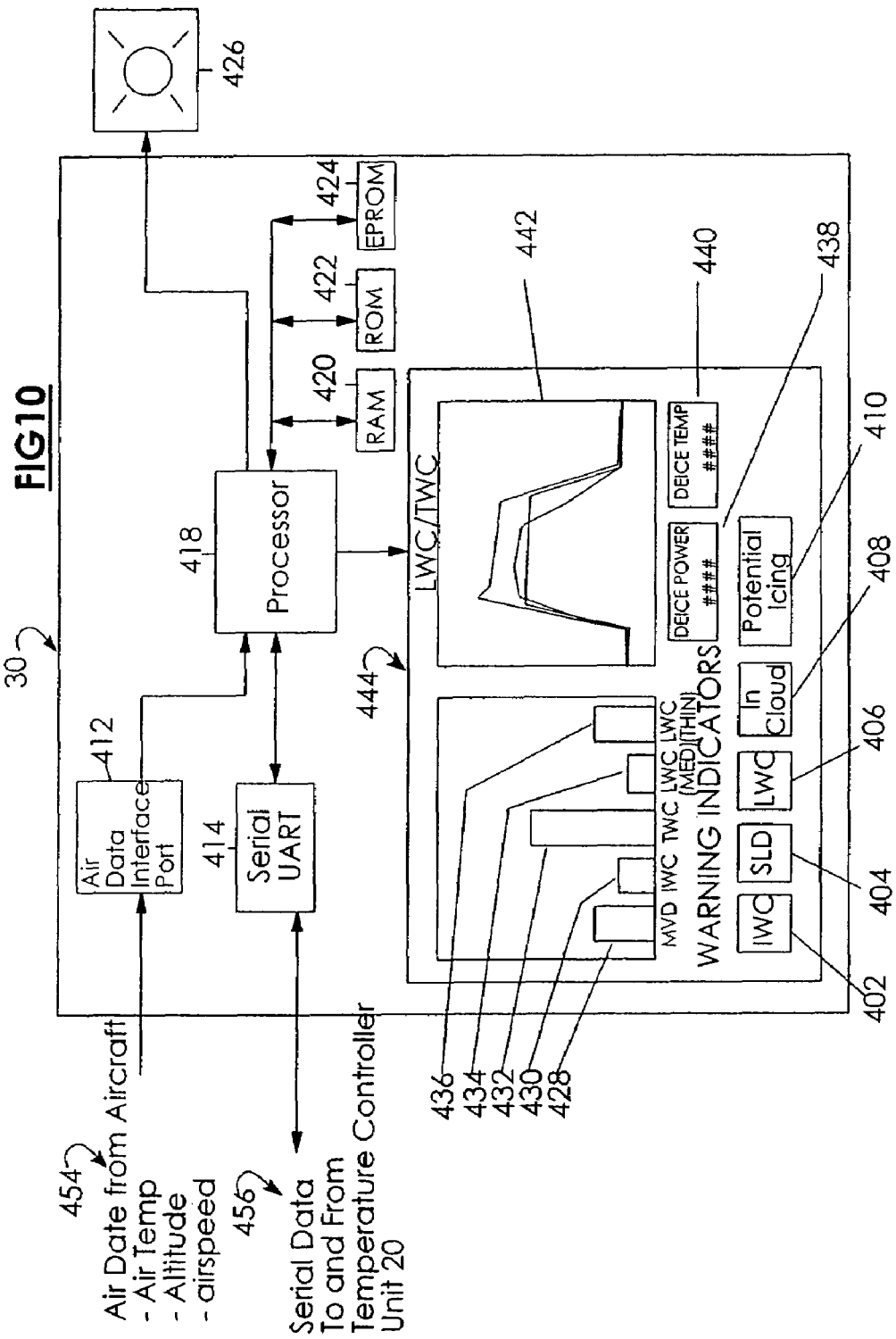

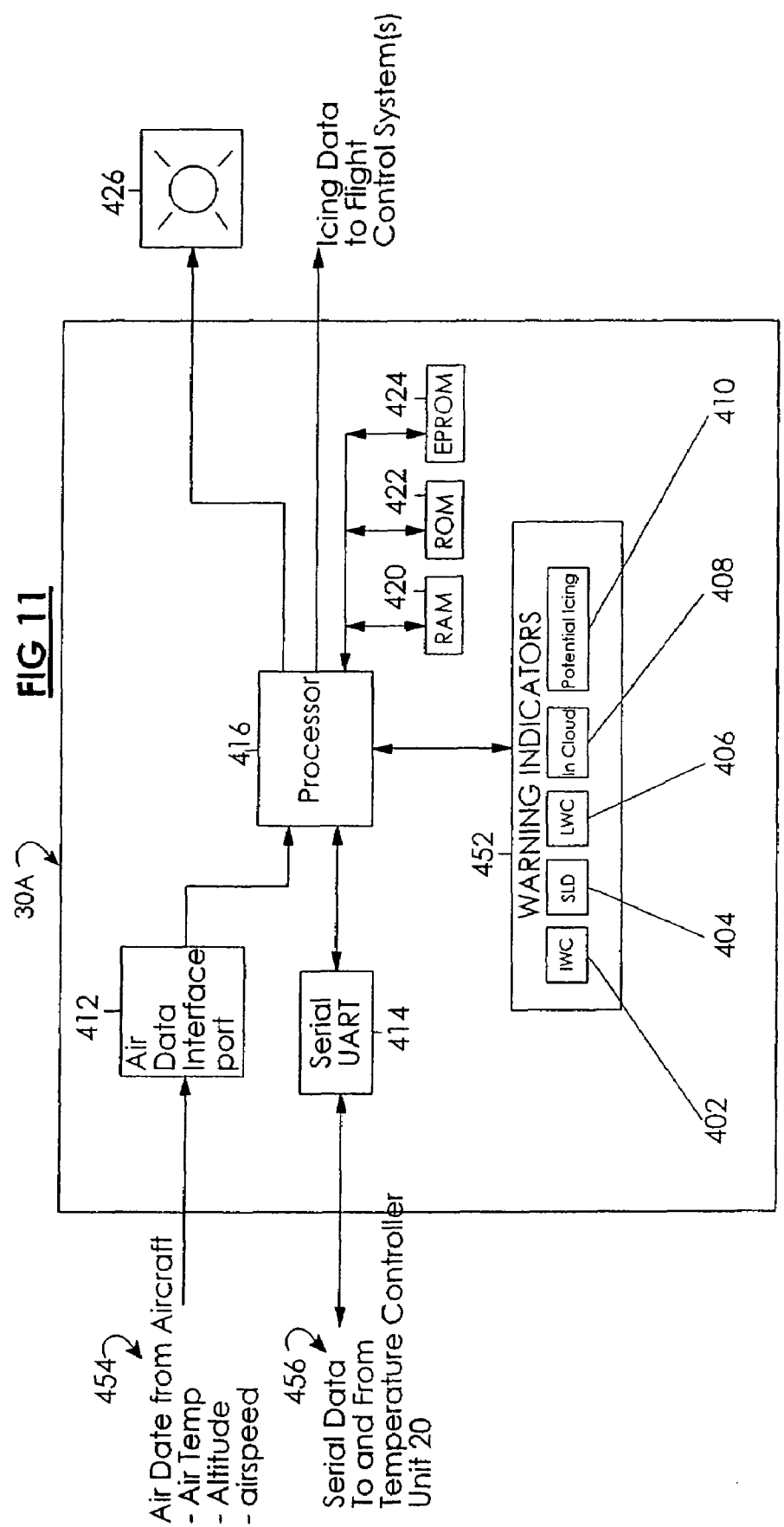

CLOUD WATER CHARACTERIZATION SYSTEM

STATEMENT REGARDING FEDERALLY SPONSORED RESEARCH OR DEVELOPMENT

This invention was partially made with U.S. Government support under Contract No. NAS3-02162. Accordingly, the U.S. Government may have certain rights in this invention.

BACKGROUND OF THE INVENTION

The present invention is generally directed to aircraft icing sensors, and in particular, to a system and methodology for providing among other things as set forth herein, a measure of a water droplet size in a cloud containing liquid water, ice water or both.

Aircraft icing is a serious safety problem for general aviation and some commuter transport airplanes. There has been tremendous growth in the commuter aviation industry in the last few years. When compared to heavy transport category aircraft, these types of aircraft generally operate at lower altitudes and consequently spend a greater proportion of their time operating in icing conditions.

Airframe icing severity depends on the liquid water content, droplet size and degree of glaciation of the cloud. Liquid water content (LWC) is normally expressed in grams/cubic meter and is a measure of the unfrozen water content of the cloud. Droplets occur in nature not in a single size but in a distribution of sizes. The median volume diameter (MVD) of the droplet distribution has historically been used as a bulk measurement of droplet spectrum size. For example, FAA aircraft and engine certification criteria are expressed in terms of a combination of LWC and MVD.

The droplet size plays a critical role in the way that ice accumulates on airframe and engine surfaces. In general the larger the MVD the more problems the accumulated ice will cause. Small droplets tend to freeze immediately on impact whereas larger droplets flow along the structural surfaces before freezing. If the drops have a very large MVD, i.e. greater than 50 microns, they may run past the anti-ice/deice systems and freeze in critical, unprotected places on the airframe. These are the so-called supercooled large drop (SLD) cases. SLD encounters are of particular interest for aviation safety.

Cloud total water content (TWC) includes both unfrozen droplets (liquid water) and frozen water in the form of ice crystals. The degree of glaciation in the cloud can be determined by comparing the liquid water content to the total water content.

In general, airframe and engine icing depend primarily on liquid water content because the unfrozen, but super-cooled droplets, freeze upon impact whereas already frozen ice crystals will not. However, there are some very important exceptions. In some particular cases of temperature and airspeed, ice crystals can melt upon impact and then refreeze. This can cause severe problems for both airframes and engines.

In the past several years there have been a number of fatal commuter aircraft accidents attributed to severe icing conditions having SLD. Though SLD was thought to occur infrequently, the significant increase in commuter aircraft traffic has raised a concern that the chances of encountering this icing condition may be far greater than previously thought. At the present time aircraft ice protection systems are not required to provide protection against SLD. Therefore a simple device that could provide warning that SLD conditions are present would be highly desirable.

Cylindrical and wire like sensors for measuring LWC are known. However, the heating for such known sensors use external windings to heat the sensor. The external windings are quite delicate giving these sensors a very short life due to damage from encounters with typical atmospheric concentrations of ice crystals. Generally speaking sensors using external heater windings are problematic because the windings create small "pockets" that trap ice crystals causing a significant fraction of ice crystals to be captured and evaporated. The evaporation of ice from a liquid water sensor therefore gives false measurements or indications of liquid water when in the presence of ice crystals.

Other prior art LWC sensors have used an internal, switched indirectly heated, cylindrical element to collect super cooled liquid water that freezes onto the cylinder. The cylinder is oscillated at its natural mechanical resonant frequency (approximately 40 kHz). As ice builds up the frequency decreases to a preset value at which time a heating cycle is initiated to clear the ice from the cylinder. The internal heater cycles on and off to remove the accumulated ice. The rate of cycling provided an indication of the amount of liquid water present.

However, it is believed that deficiencies exist in these prior art arrangements, such as the ability to reject unwanted ice crystals when measuring LWC. Tests have shown that the present invention provides a better than ten times improvement over previous LWC sensors in rejecting unwanted ice crystals, due to the shape and surface construction of the sensors.

The development of portions of the present invention has been carried out under a NASA Small Business Innovative Research (SBIR) contract between the NASA Glenn Research Facility and Science Engineering Associates, Inc. (SEA) as part of NASA's Aviation Safety Program initiative to significantly reduce aircraft accidents. Part of this program, is to establish the frequency of occurrence of SLD conditions. Once this frequency of occurrence is established, it would be expected that agencies like the Federal Aviation Administration (FAA) could use this information to affect changes in current aircraft icing certification regulations. This in turn would lead to changes in the design of aircraft ice protection systems, potentially to protect against severe icing conditions.

Present research activities aimed at establishing this frequency of occurrence have been limited to a handful of research organizations using heavily instrumented research aircraft (e.g. the NASA Glenn Research Centers' Twin Otter Icing Research Aircraft and the NRC Convair-580 aircraft). Though effective, this approach is limited in scope and somewhat biased because the research flights are specifically directed into areas having the highest probability of severe icing conditions. Therefore a more extensive approach, such as that offered by instrumenting a large number of commercial/military aircraft, would be of great value. The key to this approach is the development of a small, reliable, low power integrated icing instrument, which has not previously been available.

It is believed that the present invention, in addition to providing needed capabilities in a research environment, will also help provide the needed protection against icing in private and commercial aircraft and overcomes the deficiencies set forth above and achieves the objectives set forth herein.

SUMMARY AND OBJECTIVES OF THE PRESENT INVENTION

It is thus an objective of the present invention to overcome the deficiencies existing in the state of the art.

In particular, an objective of the present invention is to provide a plurality of sensors that are each designed, calibrated, co-located and oriented within a small common shroud, for the calculation of cloud parameters previously only possible by using multiple instruments on research aircraft.

Yet another objective of the present invention is to provide a statistical measure of the size of liquid water droplets in the cloud, commonly called the MVD (Median Volumetric Diameter).

Still another objective of the present invention is to overcome the difficulties found in the prior art of duplicating cloud conditions, and MVD in particular, in wind tunnel testing.

Yet another objective of the present invention is to provide a system and method for measurement and detection of cloud water conditions that is lightweight and suitable for use on non-research aircraft.

Further objectives of the present invention are to provide a system and method for the detection and/or measurement of the presence of a cloud, LWC, Ice Water Content (IWC), and SLD parameters.

Still other objectives and advantages of the invention will in part be obvious and will in part be apparent from the specification.

The invention accordingly comprises the features of construction, combination of elements, arrangement of parts and sequence of steps which will be exemplified in the construction, illustration and description hereinafter set forth, and the scope of the invention will be indicated in the claims.

Therefore, and generally speaking, in one embodiment, the present invention is directed to a system for determining a measure of cloud water droplet size based on sensor cooling by cloud water and stored sensor power ratio and droplet size data, the system comprising a first and second temperature controlled co-located self heated sensors, the cooling of the sensors being substantially independent of ice water; a self heated compensation sensor oriented to be substantially independent of cloud water cooling; a variable power source coupled to each first and second sensor for keeping each sensor at a temperature and each having a measurable output power; a variable power source coupled to the compensation sensor for keeping the sensor at a temperature and having a measurable output power; and a control unit for correcting the measured power to each of the first and second sensors to reflect only heat loss due to cloud water by subtracting from the measured power an adjusted compensation sensor measured value; and forming a ratio of corrected power of each of the first and second sensors to identify a liquid water droplet size based on the stored power ratio and droplet size data.

In another embodiment, the present invention is directed to a system for measuring water droplet size in a cloud, wherein the system comprises a sensor head comprising a first heated sensor having a resistance characteristic that is temperature dependent, wherein power loss from the sensor is at least essentially not affected by the presence of ice water in an airflow thereacross; a second heated sensor having a second resistance characteristic that is temperature dependent, wherein power loss from the second sensor is at least essentially not affected by the presence of ice water in the airflow thereacross; a heated compensation sensor being positioned to be responsive to the airflow thereacross and having a power loss at least essentially not affected by the presence of liquid water or ice water in the airflow thereacross; a respective temperature controller associated with each of the first sensor, second sensor and compensation sensor, each of which for maintaining the temperature of the respective sensors at respective temperature values using its temperature dependent resistance characteristic, wherein, for each of the first and second sensors, the respective controller maintains the sensor at the temperature value by adjusting a power level fed to the sensor; calculates the total power required to maintain the sensor at the temperature value when the sensor is exposed to an airflow comprising at least one of liquid water and ice water; and a control unit for receiving power levels from each of the first sensor and second sensor; subtracting, from each total power calculation, a dry power component determined from the power required to maintain the compensation sensor at its temperature value in the presence of the airflow comprising at least liquid water, thereby arriving at a wet power value attributable to the incremental power associated with maintaining the respective first and second sensors at the respective temperature values in the presence of at least liquid water in the airflow; and for forming a ratio of the wet power value of the first sensor to the wet power value of the second sensor to obtain an estimated value of the measure of water droplet size in the cloud from a predetermined calibrated relationship of wet power ratio to water droplet sizes.

In yet another embodiment, the present invention is directed to a system for determining liquid water content in a cloud, wherein the system comprises a sensor head comprising a first heated sensor having a first resistance characteristic that is temperature dependent, wherein the first sensor is at least essentially not affected by the presence of ice water in an airflow thereacross; a second heated sensor having a second resistance characteristic that is temperature dependent, wherein the second sensor is at least essentially not affected by the presence of ice water in the airflow thereacross; a heated compensation sensor being positioned to be responsive to the airflow thereacross and at least essentially not affected by the presence of liquid water or ice water in the airflow thereacross; a respective temperature controller associated with each of the first sensor, second sensor and compensation sensor, each of which for maintaining the temperature of the respective sensors at respective temperature values using its temperature dependent resistance characteristic, wherein, for each of the first and second sensors the respective controller maintains the sensor at the temperature value by adjusting a power level fed to the sensor; calculates the total power required to maintain the sensor at the temperature value when the sensor is exposed to an airflow comprising at least liquid water; and a control unit for receiving power levels from each of the first sensor and second sensor; subtracting, from each total power calculation, a dry power component determined from the power required to maintain the compensation sensor at its temperature value in the presence of the airflow thereby arriving at a wet power value attributable to the incremental power associated with maintaining the respective first and second sensors at the respective temperature values in the presence of at least liquid water in the airflow; and calculating a liquid water content for the first sensor and sensor wet power values and selecting the higher LWC as the desired liquid water content.

In still another embodiment of the present invention, a system is provided for determining liquid water content in a cloud, the liquid water having a determined droplet size, wherein the system comprises a sensor head comprising a first heated sensor having a first resistance characteristic that is temperature dependent, wherein the first sensor is at least essentially not affected by the presence of ice water in an airflow thereacross; a second heated sensor having a second resistance characteristic that is temperature dependent, wherein the second sensor is at least essentially not affected by the presence of ice water in the airflow thereacross; a heated compensation sensor being positioned to be responsive to the airflow thereacross and at least essentially not affected by the presence of liquid water or ice water in the airflow thereacross; a respective temperature controller associated with each of the first sensor, second sensor and compensation sensors, each of which for maintaining the temperature of the respective sensors at respective temperature values using its temperature dependent resistance characteristic, wherein, for each of the first and second sensors the respective controller maintains the sensor at the temperature value by adjusting a power level fed to the sensor; calculates the total power required to maintain the sensor at the temperature value when the sensor is exposed to an airflow comprising at least liquid water; and a control unit for receiving power levels from each of the first sensor and second sensor and having a stored droplet size verses liquid water content correction curve for each first and second sensor; subtracting, from each total power calculation, a dry power component determined from the power required to maintain the compensation sensor at its temperature value in the presence of the airflow thereby arriving at a wet power value attributable to the incremental power associated with maintaining the respective first and second sensors at the respective temperature values in the presence of liquid water in the airflow; and calculating a liquid water content for the first sensor and second sensor wet power values, selects the higher of the calculated liquid water content values, and corrects the higher of the two values using a droplet size verses liquid water content correction curve.

In yet another embodiment, a system is provided for determining the presence of ice water in an airflow, wherein the system comprises a sensor head comprising a first heated sensor having a first resistance characteristic that is temperature dependent, wherein heat the from first sensor is at least essentially not affected by the presence of ice water in the airflow thereacross; a second heated sensor having a second resistance characteristic that is temperature dependent, wherein heat from the second sensor is at least essentially not affected by the presence of ice water in the airflow thereacross; a third heated sensor having a third resistance characteristic that is temperature dependent, wherein heat loss from the third sensor is affected by a presence of ice water in the airflow thereacross; a heated compensation sensor being positioned to be responsive to the airflow thereacross and having a heat loss least essentially not affected by the presence of liquid water or ice water in the airflow thereacross; a respective temperature controller associated with each of the first sensor, second sensor, third sensor and compensation sensors, each of which for maintaining the temperature of the respective sensors at respective temperature values using its temperature dependent resistance characteristic, wherein, for each of the first, second and third sensors, the respective controller maintains the sensor at the temperature value by adjusting a power level fed to the sensor; calculates the total power required to maintain the sensor at the temperature value when the sensor is exposed to an airflow comprising at least ice water; and a control unit for receiving power levels from each of the first sensor and second sensor; subtracting, from each total power calculation, a dry power component determined from the power required to maintain the compensation sensor at its temperature value in the presence of the airflow comprising at least ice water, thereby arriving at a wet power value attributable to the incremental power associated with maintaining the respective first, second and third sensors at the respective temperature values in the presence of at least ice water in the airflow; and calculating a water content measurement for the first sensor, second sensor and third sensor wet power values, selecting a higher water content value from the first and second sensor and subtracting the higher value from the water content value of the third sensor to indicate a presence of ice water.

In still another embodiment, a system is provided for warning of cloud water, the system comprising a first temperature controlled self heated sensor, a variable power source for the first sensor having a measurable output power responsive to changes in cloud water; a processor for averaging the measured output power of the power source and subtracting a substantially instantaneous measure of the output power of the power source to determine fluctuations around the average; and comparing the fluctuations to a threshold indicative of the presence of cloud water.

In still further embodiments, the system for determining a measure of cloud water droplet size based on sensor cooling by cloud water and stored sensor power ratio and droplet size data, may comprise means for keeping each of the first and second sensors at a temperature and each having a measurable output power; for keeping the compensation sensor at a temperature and having a measurable output power; correcting the measured power to each of the first and second sensors to reflect only heat loss due to cloud water by subtracting from the measured power an adjusted compensation sensor measured value; and forming a ratio of corrected power of each of the first and second sensors to identify a liquid water droplet size based on the stored power ratio and droplet size data.

Similarly, in yet another embodiment, the system for measuring water droplet size in a cloud may comprise means associated with each of the first sensor, second sensor and compensation sensor, for maintaining the temperature of the respective sensors at respective temperature values using its temperature dependent resistance characteristic, wherein, for each of the first and second sensors, the means maintains the sensor at the temperature value by adjusting a power level fed to the sensor and calculates the total power required to maintain the sensor at the temperature value when the sensor is exposed to an airflow comprising at least one of liquid water and ice water; and means for receiving power levels from each of the first sensor and second sensor; subtracting, from each total power calculation, a dry power component determined from the power required to maintain the compensation sensor at its temperature value in the presence of the airflow comprising at least liquid water, thereby arriving at a wet power value attributable to the incremental power associated with maintaining the respective first and second sensors at the respective temperature values in the presence of at least liquid water in the airflow; and for forming a ratio of the wet power value of the first sensor to the wet power value of the second sensor to obtain an estimated value of the measure of water droplet size in the cloud from a predetermined calibrated relationship of wet power ratio to water droplet sizes.

Likewise, the system for determining liquid water content in a cloud may comprise means associated with each of the first sensor, second sensor and compensation sensor, for maintaining the temperature of the respective sensors at respective temperature values using its temperature dependent resistance characteristic, wherein, for each of the first and second sensors the sensor is maintained at the temperature value by adjusting a power level fed to the sensor; and the total power required to maintain the sensor at the temperature value when the sensor is exposed to an airflow comprising at least liquid water is calculated; and means for receiving power levels from each of the first sensor and second sensor; subtracting, from each total power calculation, a dry power component determined from the power required to maintain the compensation sensor at its temperature value in the presence of the airflow thereby arriving at a wet power value attributable to the incremental power associated with maintaining the respective first and second sensors at the respective temperature values in the presence of at least liquid water in the airflow; and calculating a liquid water content for the first sensor and sensor wet power values and selecting the higher LWC as the desired liquid water content.

Moreover, the system for determining liquid water content in a cloud, the liquid water having a determined droplet size, may comprise means associated with each of the first sensor, second sensor and compensation sensors, each of which for maintaining the temperature of the respective sensors at respective temperature values using its temperature dependent resistance characteristic, wherein, for each of the first and second sensors the means maintains the sensor at the temperature value by adjusting a power level fed to the sensor and calculates the total power required to maintain the sensor at the temperature value when the sensor is exposed to an airflow comprising at least liquid water; and means for receiving power levels from each of the first sensor and second sensor and having a stored droplet size verses liquid water content correction curve for each first and second sensor; subtracting, from each total power calculation, a dry power component determined from the power required to maintain the compensation sensor at its temperature value in the presence of the airflow thereby arriving at a wet power value attributable to the incremental power associated with maintaining the respective first and second sensors at the respective temperature values in the presence of liquid water in the airflow; and calculating a liquid water content for the first sensor and second sensor wet power values, selects the higher of the calculated liquid water content values, and corrects the higher of the two values using a droplet size verses liquid water content correction curve.

Still further, the system for determining the presence of ice water in an airflow may comprise means associated with each of the first sensor, second sensor, third sensor and compensation sensors, each of which for maintaining the temperature of the respective sensors at respective temperature values using its temperature dependent resistance characteristic, wherein, for each of the first, second and third sensors, the means maintains the sensor at the temperature value by adjusting a power level fed to the sensor and calculates the total power required to maintain the sensor at the temperature value when the sensor is exposed to an airflow comprising at least ice water; and means for receiving power levels from each of the first sensor and second sensor; subtracting, from each total power calculation, a dry power component determined from the power required to maintain the compensation sensor at its temperature value in the presence of the airflow comprising at least ice water, thereby arriving at a wet power value attributable to the incremental power associated with maintaining the respective first, second and third sensors at the respective temperature values in the presence of at least ice water in the airflow; and calculating a water content measurement for the first sensor, second sensor and third sensor wet power values, selecting a higher water content value from the first and second sensor and subtracting the higher value from the water content value of the third sensor to indicate a presence of ice water.

The present invention is also directed to a plurality of methodologies. For example, in accordance with a first embodiment, a method for determining a measure of cloud water droplet size based on sensor cooling by cloud water and stored sensor power ratio and droplet size data, utilizing a system comprising a first and second temperature controlled co-located self heated sensors, the cooling of the sensors being substantially independent of ice water, a self heated compensation sensor oriented to be substantially independent of cloud water cooling; a variable power source coupled to each first and second sensor for keeping each sensor at a temperature and each having a measurable output power; and a variable power source coupled to the compensation sensor for keeping the sensor at a temperature and having a measurable output power, wherein the method comprises the steps of correcting the measured power to each of the first and second sensors to reflect only heat loss due to cloud water by subtracting from the measured power an adjusted compensation sensor measured value; and forming a ratio of corrected power of each of the first and second sensors to identify a liquid water droplet size based on the stored power ratio and droplet size data.

In yet another embodiment, the present invention is directed to a method of measuring water droplet size in an airflow, utilizing a system comprising a sensor head comprising a first heated sensor having a resistance characteristic that is temperature dependent, wherein power loss from the sensor is at least essentially not affected by the presence of ice water in the airflow thereacross; a second heated sensor having a second resistance characteristic that is temperature dependent, wherein power loss from the second sensor is at least essentially not affected by the presence of ice water in the airflow thereacross; a heated compensation sensor being positioned to be responsive to the airflow thereacross and having a power loss at least essentially not affected by the presence of liquid water or ice water in the airflow thereacross, wherein the method comprises the steps of maintaining the temperature of the respective sensors at respective temperature values using its temperature dependent resistance characteristic; and wherein, for each of the first and second sensors, the method comprises the steps of maintaining the sensor at the temperature value by adjusting a power level fed to the sensor and calculating the total power required to maintain the sensor at the temperature value when the sensor is exposed to an airflow comprising at least one of liquid water and ice water; wherein the method further comprises the steps of receiving power levels from each of the first sensor and second sensor; subtracting, from each total power calculation, a dry power component determined from the power required to maintain the compensation sensor at its temperature value in the presence of the airflow comprising at least liquid water, thereby arriving at a wet power value attributable to the incremental power associated with maintaining the respective first and second sensors at the respective temperature values in the presence of at least liquid water in the airflow; and forming a ratio of the wet power value of the first sensor to the wet power value of the second sensor to obtain an estimated value of the measure of water droplet size in the cloud from a predetermined calibrated relationship of wet power ratio to water droplet sizes.

In still yet another embodiment, a method is provided for determining liquid water content in an airflow, utilizing a system comprising a sensor head comprising a first heated sensor having a first resistance characteristic that is temperature dependent, wherein the first sensor is at least essentially not affected by the presence of ice water in an airflow thereacross; a second heated sensor having a second resistance characteristic that is temperature dependent, wherein the second sensor is at least essentially not affected by the presence of ice water in the airflow thereacross; a heated compensation sensor being positioned to be responsive to the airflow thereacross and at least essentially not affected by the presence of liquid water or ice water in the airflow thereacross; wherein the method comprises the steps of maintaining the temperature of the respective sensors at respective temperature values using its temperature dependent resistance characteristic, maintaining the sensors at the temperature value by adjusting a power level fed to the sensor; calculating the total power required to maintain the sensor at the temperature value when the sensor is exposed to an airflow comprising at least liquid water; receiving power levels from each of the first sensor and second sensor; subtracting, from each total power calculation, a dry power component determined from the power required to maintain the compensation sensor at its temperature value in the presence of the airflow thereby arriving at a wet power value attributable to the incremental power associated with maintaining the respective first and second sensors at the respective temperature values in the presence of at least liquid water in the airflow; and calculating a liquid water content for the first sensor and sensor wet power values and selecting the higher LWC as the desired liquid water content.

Still in another embodiment, a method is provided for determining liquid water content in an airflow, the liquid water having a determined droplet size, utilizing a system comprising a sensor head comprising a first heated sensor having a first resistance characteristic that is temperature dependent, wherein the first sensor is at least essentially not affected by the presence of ice water in an airflow thereacross; a second heated sensor having a second resistance characteristic that is temperature dependent, wherein the second sensor is at least essentially not affected by the presence of ice water in the airflow thereacross; a heated compensation sensor being positioned to be responsive to the airflow thereacross and at least essentially not affected by the presence of liquid water or ice water in the airflow thereacross; wherein the method comprises the steps of maintaining the temperature of the respective sensors at respective temperature values using its temperature dependent resistance characteristic and, for each of the first and second sensors, maintaining maintains the sensor at the temperature value by adjusting a power level fed to the sensor and calculating the total power required to maintain the sensor at the temperature value when the sensor is exposed to an airflow comprising at least liquid water; wherein the method further comprises the steps of receiving power levels from each of the first sensor and second sensor and having a stored droplet size verses liquid water content correction curve for each first and second sensor; subtracting, from each total power calculation, a dry power component determined from the power required to maintain the compensation sensor at its temperature value in the presence of the airflow thereby arriving at a wet power value attributable to the incremental power associated with maintaining the respective first and second sensors at the respective temperature values in the presence of liquid water in the airflow; and calculating a liquid water content for the first sensor and second sensor wet power values, selects the higher of the calculated liquid water content values, and corrects the higher of the two values using a droplet size verses liquid water content correction curve.

In yet another embodiment, a method is provided for determining the presence of ice water in an airflow, utilizing a system comprising a sensor head comprising a first heated sensor having a first resistance characteristic that is temperature dependent, wherein heat the from first sensor is at least essentially not affected by the presence of ice water in the airflow thereacross; a second heated sensor having a second resistance characteristic that is temperature dependent, wherein heat from the second sensor is at least essentially not affected by the presence of ice water in the airflow thereacross; a third heated sensor having a third resistance characteristic that is temperature dependent, wherein heat loss from the third sensor is affected by a presence of ice water in the airflow thereacross; a heated compensation sensor being positioned to be responsive to the airflow thereacross and having a heat loss least essentially not affected by the presence of liquid water or ice water in the airflow thereacross; wherein the method comprises the steps of maintaining the temperature of the respective sensors at respective temperature values using its temperature dependent resistance and wherein, for each of the first, second and third sensors, maintaining the sensor at the temperature value by adjusting a power level fed to the sensor and calculating the total power required to maintain the sensor at the temperature value when the sensor is exposed to an airflow comprising at least ice water; wherein the method further comprises the steps of receiving power levels from each of the first sensor and second sensor; subtracting, from each total power calculation, a dry power component determined from the power required to maintain the compensation sensor at its temperature value in the presence of the airflow comprising at least ice water, thereby arriving at a wet power value attributable to the incremental power associated with maintaining the respective first, second and third sensors at the respective temperature values in the presence of at least ice water in the airflow; and calculating a water content measurement for the first sensor, second sensor and third sensor wet power values, selecting a higher water content value from the first and second sensor and subtracting the higher value from the water content value of the third sensor to indicate a presence of ice water.

In still another preferred embodiment of the present invention, a method is provided for warning of cloud water using a first temperature controlled self heated sensor and a variable power source for the first sensor having a measurable output power responsive to changes in cloud water, wherein the method comprises the steps of averaging the measured output power of the power source; subtracting a substantially instantaneous measure of the output power of the power source to determine fluctuations around the average; and comparing the fluctuations to a threshold indicative of the presence of cloud water.

BRIEF DESCRIPTION OF THE DRAWINGS

The above set forth and other features of the invention are made more apparent in the ensuing Description of the Preferred Embodiments when read in conjunction with the attached Drawings, wherein:

FIGS. 2A, 2B, 2C, 2D, 2E, 2F, and 2G are perspective, detail and cross-sectional views of a sense head constructed in accordance with the present invention;

FIGS. 3A, 3B, 3C and 3D are differing views of the various sensors used in the present invention;

FIG. 10 depicts a control unit constructed in accordance with the invention; and FIG. 11 depicts an alternate embodiment of a control unit in accordance with the invention.

Identical reference numerals in the figures are intended to indicate like parts, although not every feature in every figure may be called out with a reference numeral.

DETAILED DESCRIPTION OF THE PREFERRED EMBODIMENTS

Figure 1:
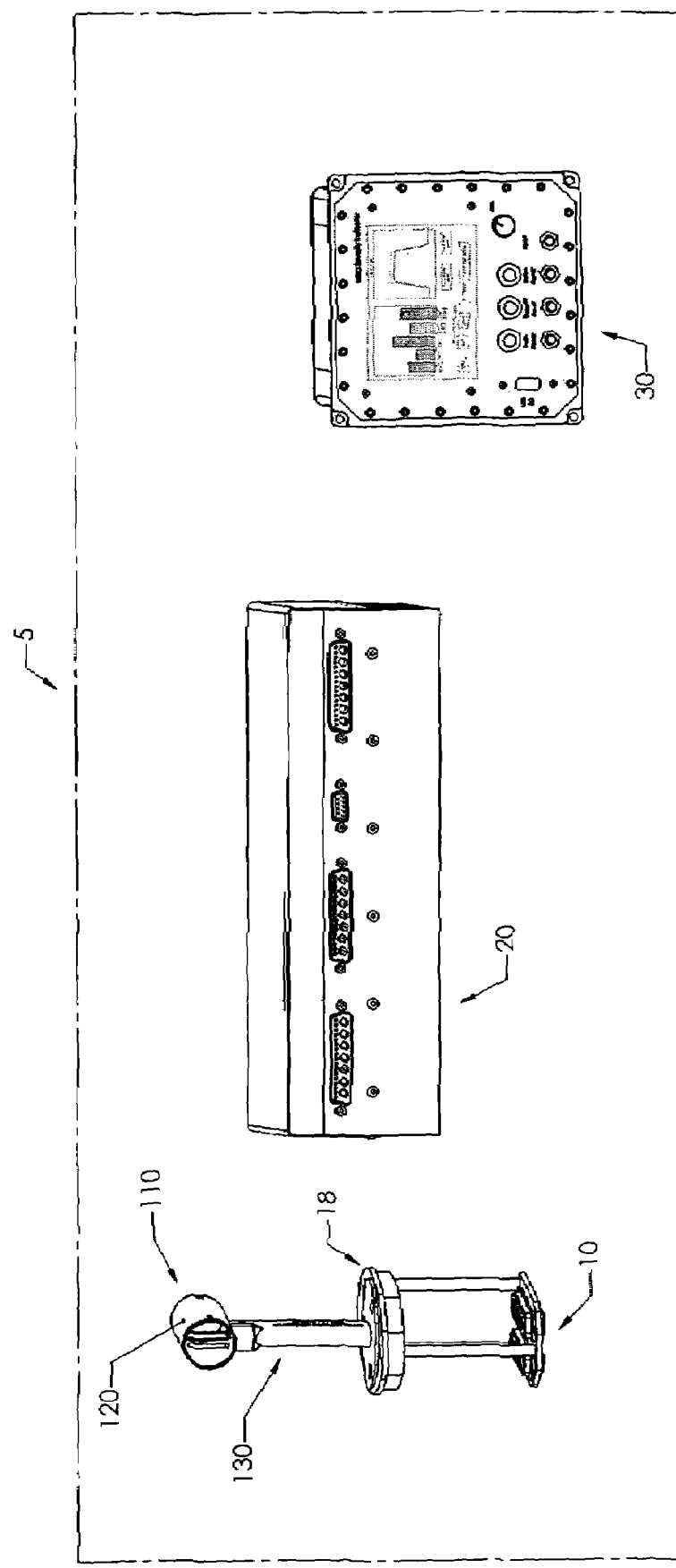
FIG. 1 is a view of an overall system constructed in accordance with the present invention.

As will be set forth in greater detail below, the present invention, generally speaking, uses the heat loss from a medium diameter sensor, thin diameter sensor and semi-cylindrical shaped scoop-like sensor that are each designed, calibrated, co-located and oriented within a small common shroud, for the calculation of cloud parameters previously only possible by using multiple instruments on research aircraft.

Among other things, the invention measures cloud ice water content (IWC), liquid water content (LWC) and total cloud water content (TWC), which is the sum of the cloud LWC and IWC, all of which are measured in $gm/m^3$. In addition, the present invention provides a statistical measure of the size of liquid water droplets in the cloud (e.g. the MVD). As used herein, the term MVD is defined as a droplet diameter that divides the total amount of cloud water in half; half the water volume will have droplets with diameters larger than the MVD value and half of the water volume will have droplet diameters smaller that the MVD value. MVD is measured in microns.

As is will be understood by one skilled in the art, there are a number of measures of droplet size other than MVD that are useable with the invention. These include: Average Drop Diameter, Median Drop Diameter, Mode Drop Diameter, Average Volume Diameter, Mode Volume Diameter and Sauter Mean Diameter all of which can characterize an aggregate of drops where the individual drops come in various sizes. The particular characterization is substantially determined by the calibration device(s)/method(s) used for the invention. The term MVD, which is the term preferred by the FAA, is often used herein to characterize drop size but its use is in no way intended to limit the invention.

As is known to those skilled in the art, cloud conditions, and MVD in particular, are very difficult to duplicate consistently in different wind tunnels or even in a single wind tunnel. This condition results from the nature of the hardware used to form cloud ice and water as well as the instrumentation used to measure the parameters of the formed cloud. The present inventors have found, however, that the present invention provides excellent repeatability and allows its use as a standard for comparing wind tunnels as well as the accuracy and repeatability needed to improve safety of flight in all aircraft.

The present invention uses the principle that the total electrical power required to maintain a heated sensing element at a preset constant temperature is substantially equal to the power lost due to interaction of the sensing element with the cloud environment. When the sensor is moving relative to moisture laden air and heated to a temperature that will cause water in contact with a sensor to evaporate, then the total heat loss can be expressed as the sum of the heat loss that would occur if there was no moisture being evaporated (dry power) and the heat lost from the sensor due to evaporation of liquid water or ice water present (as the case may be) on the sensor (wet power).

In addition, the invention uses the known principle that the heat loss from a specific sensor geometry can be used in an analysis of cloud water to differentiate between water and ice as well as droplet sizes. The geometry of the sensor is important since it affects its ability to "capture" and or "hold" the water from a cloud long enough to cause evaporation.

The present inventors have also discovered in wind tunnel tests that the use of a semi-cylindrical shaped self heated scoop-like sensor (scoop sensor) provides improved measurement of TWC as compared to prior art conical shaped TWC sensors. Likewise, the present inventors have found that a large fraction of the water present in ice crystals is lost when the ratio of the width to the depth of a scoop sensor is one half or less. By definition a half cylinder has a width to depth ratio of exactly one half.

Through testing, the present inventors have found that adding additional depth in the form of straight sides, or extensions 174, as shown in FIG. 3C, leading into the half cylinder greatly increases the amount of water measured from ice crystals. We have tested scoop sensors with a width to depth ratio of 0.5 to 4.0 and have found that deeper tends to be better with respect to ice water measurement, but the extra heated surface of the deeper ratio elements requires additional dry power, which requires larger power supplies and their attendant disadvantages. A compromise between power and measurement accuracy occurs for a range of depth to width ratios from between about 1.0 to about 2.0.

The loss of water from ice crystals is due to the fact that the ice arrives inside the scoop in solid form which cannot spread out quickly, like a liquid droplet, until it is melted. This takes additional time. If the ice crystal and the liquid water derived from the ice crystal are not retained in the scoop, then the accuracy of the measurement of the amount of ice is reduced.

In addition, the straight sides or extensions 174 on the basic half cylinder establish circulation currents inside the scoop that tend to keep ice and water from escaping from scoop 116. A second purpose of the straight sides 174 is to help prevent the loss of ice crystals by direct bouncing out of scoop 116 and back into the air stream.

An advantage using directly heated sensors is the increased intimacy of contact with the ice crystal in the case of the scoop sensor which helps to impart heat to the crystal as rapidly as possible. Likewise with the medium and thin sensors, discussed below, the self heated configuration provides improved evaporation efficiency for water droplets and allows smooth surface conditions which helps discriminate against ice.

Also, as indicated above, testing has determined that there is a better than ten (10) times improvement over prior art LWC sensors in rejecting unwanted ice crystals due to the use of a medium and thin sensor having a substantially smooth external surface of less than about 2.5 μm. Likewise we have found that the response time of each of the sensors with their associated temperature controller power supply is less than 0.01 seconds thus allowing the identification of pockets of cloud water during flight.

The present invention determines measures of LWC from the wet power lost from a medium and thin sensor and MVD by using a calibrated ratio of wet power lost from the medium sensor to wet power lost from the thin sensor.

We have also discovered in wind tunnel tests that the preferred sensor temperature control systems and sensors, having low thermal mass, are responsive to short term "bursts" of ice water or liquid water and allows early detection of cloud water.

The present invention provides two temperature control systems. The first system is used to maintain each sensor at a known temperature so that the wet and dry power values discussed above can be determined. The second system controls the average temperature of the shroud to prevent ice build up on the sensor and minimize errors that may occur due to undesirable heat flow paths not related to the evaporation of water or determination of dry power. The heated shroud provides the additional benefit of operation even at zero airspeed.

Turning now to the figures in particular, reference is first made to FIG. 1, which illustrates an overall view of the system of the present invention, generally indicated at 5. System 5 comprises a sensor head, generally indicated at 10, a temperature controller generally indicated at 20 and a control unit generally indicated at 30.

Figure 2B:
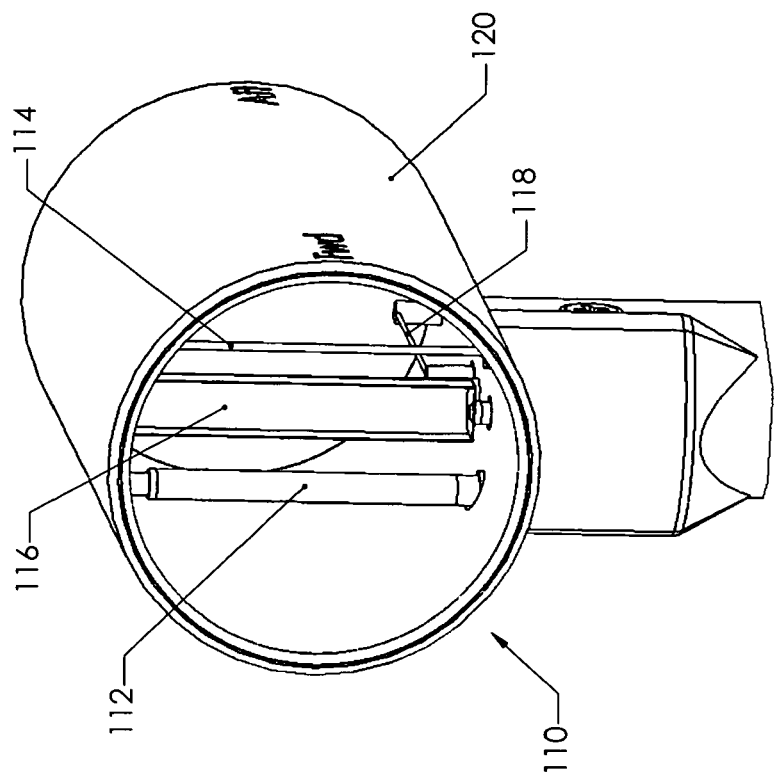
Figure 2A:
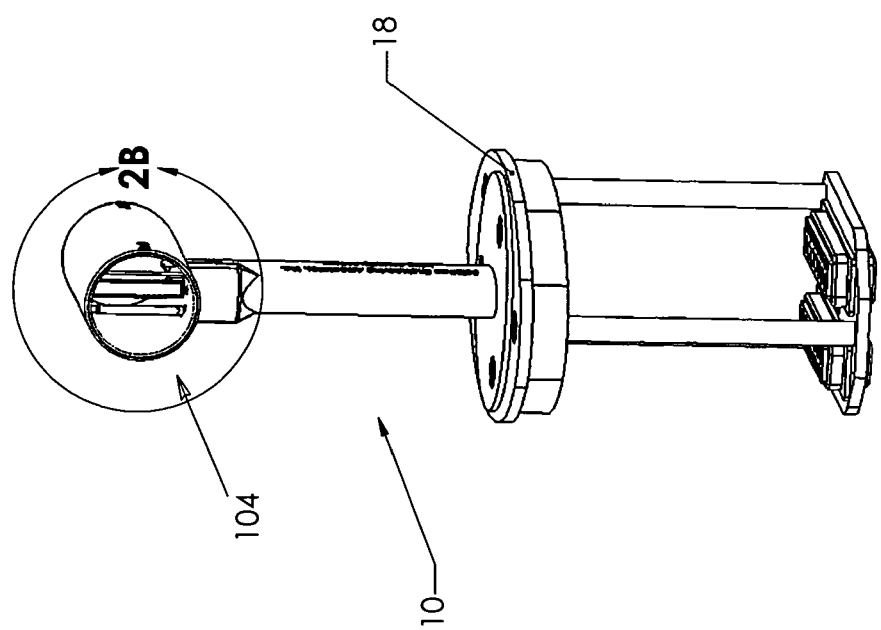

As illustrated in FIGS. 2A-2C, sensor head 10 includes a sensor module 110 having four sensors; a medium sensor 112, thin sensor 114, scoop sensor 116, and compensation sensor 118. Sensor head 10 also includes heated shroud 120, a heated strut 130 and a mounting surface 18 for mounting the sensor head 10 to an aircraft surface or wind tunnel (not shown). Sensor head 10 is preferably mounted with strut 130 in a horizontal position for receiving air stream 104.

Temperature controller 20 includes individually controlled power sources that power each sensor located in sensor module 110 and keep each of the sensors at a predetermined temperature which is preferably 140 degrees C. The strut 130 and shroud 120 include individual heaters (not shown in FIG. 1) that are powered by a single deice temperature control system 308 shown in FIG. 5 that is also located in temperature controller 20.

Figure 2G:
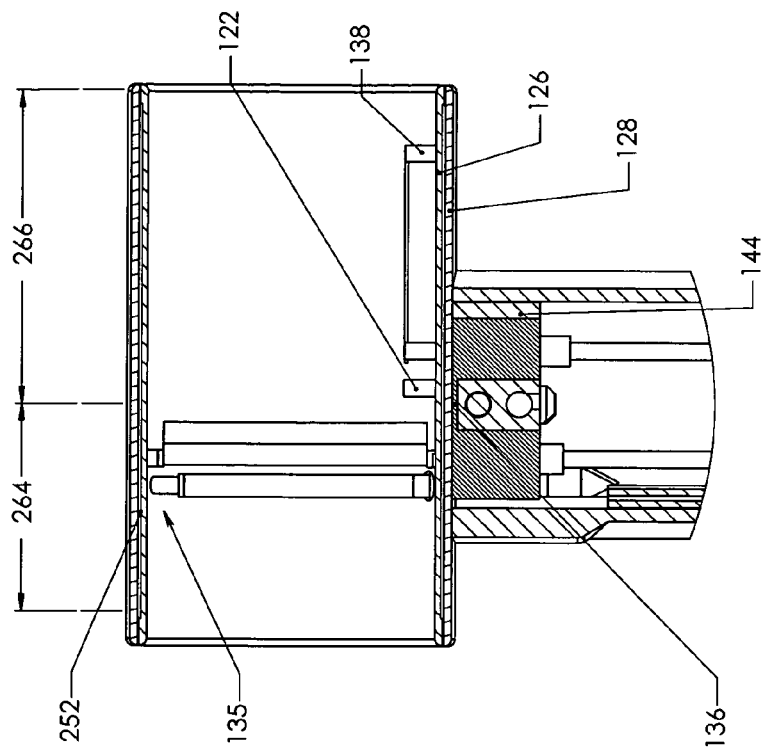
Figure 2F:
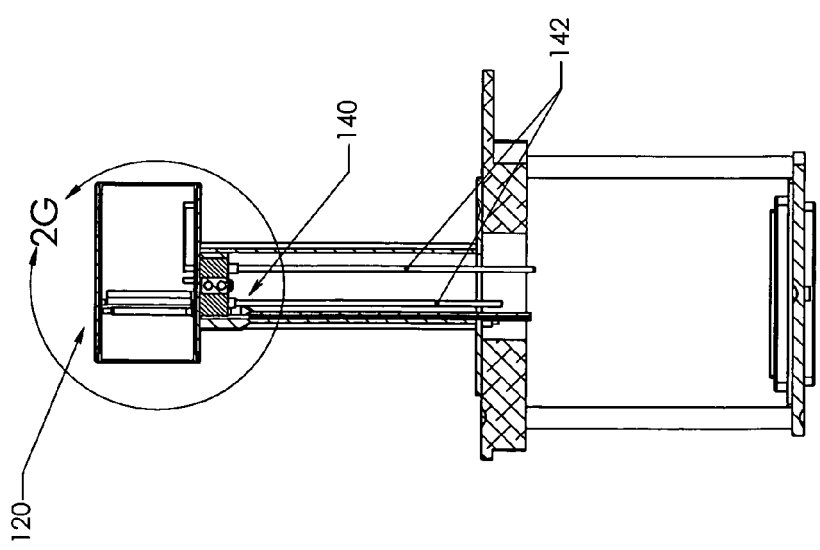

The temperature of each sensor 114, 116, 112, and 118 is determined by measurement of each sensor's electrical resistance and holding that resistance substantially constant by varying the amount of electrical power passed through the sensor. The shroud and strut temperatures are controlled using a thermistor (not shown in FIG. 1) to feed back a resistance value from which temperature is readily calculated. The thermistor 140 is located at the interface between the sensor module 110 and the strut, as shown in FIG. 2F.

Sensor Details

Turning to FIGS. 2A and 2B in particular and as mentioned above, sensor module 110 houses the four self heated sensors, namely scoop sensor 116, medium sensor 112, thin sensor 114 and compensation sensor 118. The scoop sensor 116, medium sensor 112, and thin sensor 114 are oriented substantially normal to the direction of airflow and parallel to each other. These sensors have a projected area in the flow of air of approximately their width times their height. The compensation sensor 118, being oriented parallel to the airflow 104, has a projected area into the airflow of approximately equal to its cross sectional area Front, top (cross-sectional) and side (cross-sectional) views of sensor head 10 are shown in FIGS. 2C-2G. Strut 130 assists to keep sensor head 10 away from the mounting surface and fairing 134 provides a transition from the sense module 110 to strut 130. The relative locations of the sensors 114, 116 and 112 and compensation sensor 118 are shown in the various figures of FIGS. 2D and 2E. In the preferred embodiment, sensors 112 and 114 are mounted forward of the scoop sensor 116, which is itself mounted forward of compensation sensor 118. This preferred layout reduces errors due to liquid water bouncing off scoop sensor 116 from striking either the medium sensor 112 or thin sensor 114. Further, having scoop sensor 116 forward of compensation sensor 118 introduces turbulence in the vicinity of compensation sensor 118, thus improving its linearity as a function of airspeed.

Small protrusion 122 in FIG. 2E is a small nickel plated copper pin preferably about 0.063 inch dia×0.150 inch high (1.6 mm dia×3.81 mm high). Because the fwd mounting post for compensation sensor 118 is preferably electrically insulated from both the inner shroud 126 and the outer shroud 128, it is not sufficiently deiced for all conditions by the heated shroud.

Under very cold conditions ice can build up on the leading edge of the mounting post for compensation sensor 118 and change the airflow around the compensation sensor 118 resulting in a poor estimate of dry power. The purpose of protrusion 122 is to intercept and warm stray water that passes scoop sensor 116 and keep it from freezing onto the front mounting post of the compensation element 118.

Compensation sensor 118 is mounted parallel to the airflow and therefore exposed only to the cooling effects of the general flow and not to cooling from liquid water or ice water. Because the power required to maintain the compensation sensor 118 at a given temperature in moisture free air is proportional to only the amount of airflow in airstream 104, this power value is used to determine the wet power for each sensor which is the incremental power needed to evaporate water on the medium sensor 112, the thin sensor 114, and the scoop sensor 116.

Figure 7:
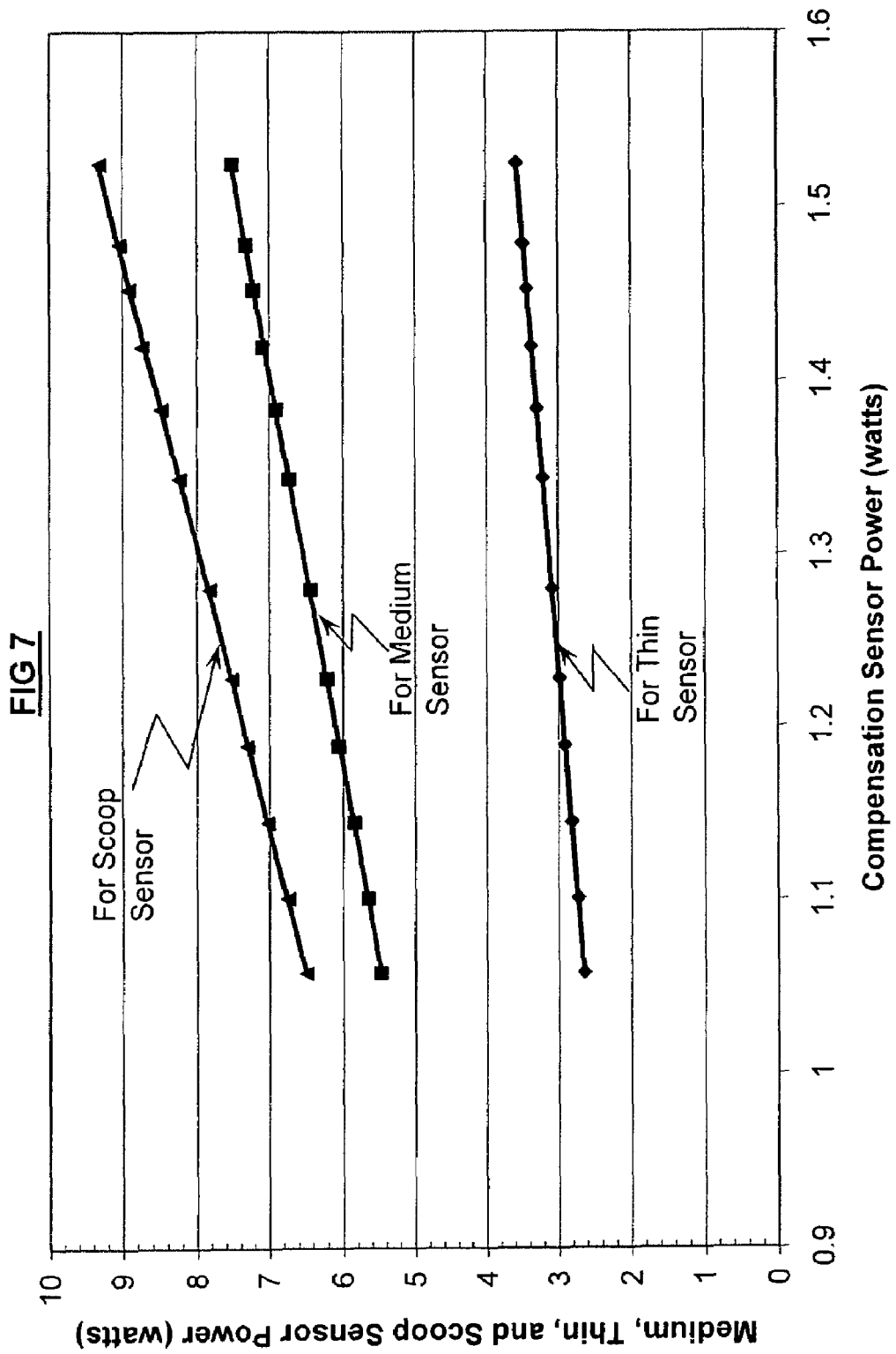
FIG. 7 relates dry power for a compensation sensor to dry power for a medium, a thin and a scoop sensor.

Because the geometries and locations of the medium sensor, thin sensor, scoop sensor and compensation sensors are different, correction curves relating dry power values as measured by the compensation sensor to dry powers for the medium sensor 112, thin sensor 114 and scoop sensor 116 is required, the preferred embodiment being illustrated in FIG. 7.

FIGS. 3A-3C, in conjunction with Table 1 as set forth below, gives the preferred mechanical and electrical parameters of thin sensor 114 (shown in FIG. 3A), medium sensor 112 (shown in FIG. 3B), scoop sensor 116 (shown in FIG. 3C) and the compensation sensor 118 (shown in FIG. 3D).

Scoop sensor 116 is preferably substantially ½ of a directly heated cylinder (split lengthwise) having flattened extensions giving an overall width to depth ratio of about 1.0 and an overall length of approximately 24 mm, dimensions of which are illustrated in the FIG. 3C.

Scoop sensor 116 includes end caps 172 which are welded to both ends of the scoop sensor 116. End caps 172 include holes for receiving a necked down section of copper connector 166 for soldering to a shroud mounted pin 167. Shroud pin 167 is soldered to shroud 120 forming a ground connection for scoop sensor 116. Medium sensor 112 receives neck down copper connector 162 and neck down connector 168 receives thin sensor 114 to make ground connections by soldering to shroud mounting pins 167 in a manner similar to that described for scoop sensor 116. Copper connectors 162, 166 and 168 are preferably silver soldered to each of the sensors. A similar arrangement (not shown) provides a ground connection for compensation sensor 118 at 138 in FIG. 2G. Each of connection points 167 and 138 provide substantially rigid single ended supports for each of the sensor to accommodate thermal expansion of the sensors 112, 114, 116 and 118.

Medium sensor 114 is preferably a cylinder so that the majority of the power dissipated by the sensor takes place on its surface in direct contact with any water on the sensor. The thin sensor 114 is preferably a solid wire of stainless steel having the preferred dimensions given in FIG. 3A.

Surface roughness may be added to the inside of scoop sensor 116 in the form of ridges, convolutions, or indentations, which tend to increase the retention of water melted from ice crystals and therefore give more opportunity for evaporation. Alternatively, bonding a rough material having a high electrical resistance and low thermal resistance, such as diamond chips or silicon carbine chips, may be used to increase the surface roughness. Testing indicates that a surface roughness of greater than about approximately 2.5 μm peak to peak for scoop sensor 116 and less than approximately 2.5 μm peak to peak for medium sensor 112 and thin sensor 114 are preferred.

Alternate embodiments of the scoop sensor 116 include shapes having open-sided rectangular, triangular, trapezoidal or square-like cross-sections through their long axis. Alternate embodiments of the medium sensor 112 and thin sensor 114 include shapes having rectangular, triangular, trapezoidal or square-like cross-sections through their long axis.

FIGS. 2A-2G illustrates other features, including certain mounting features, of the present invention, such as the insulation block, grounding and power source connections to each of the sensors.

Temperature Control Systems

Figure 4:
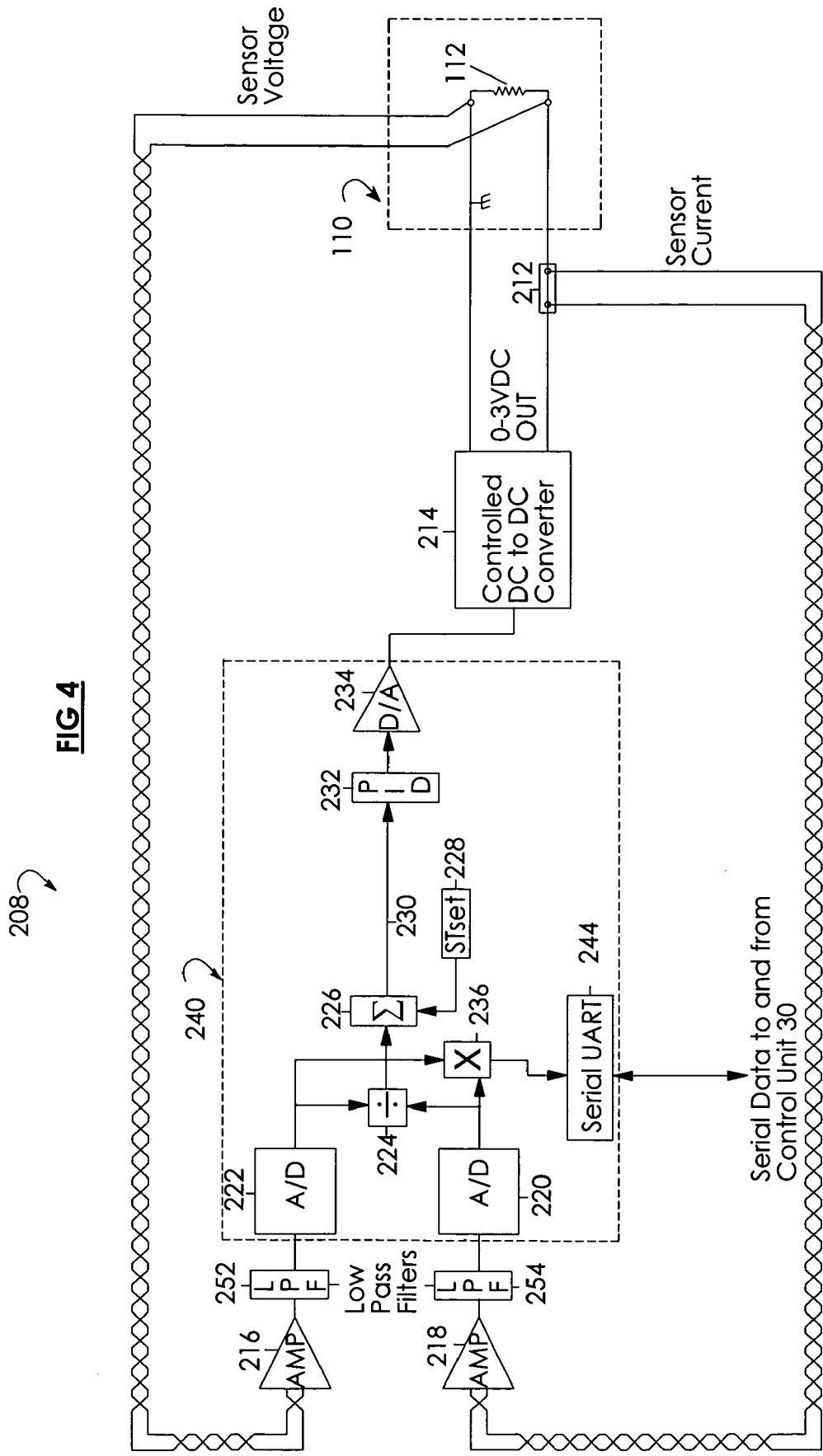
FIG. 4 is an exemplary temperature control circuit constructed in accordance with the present invention for use in connection with each of the sensors set forth in FIGS. 3A, 3B, 3C and 3D.
Figure 5:
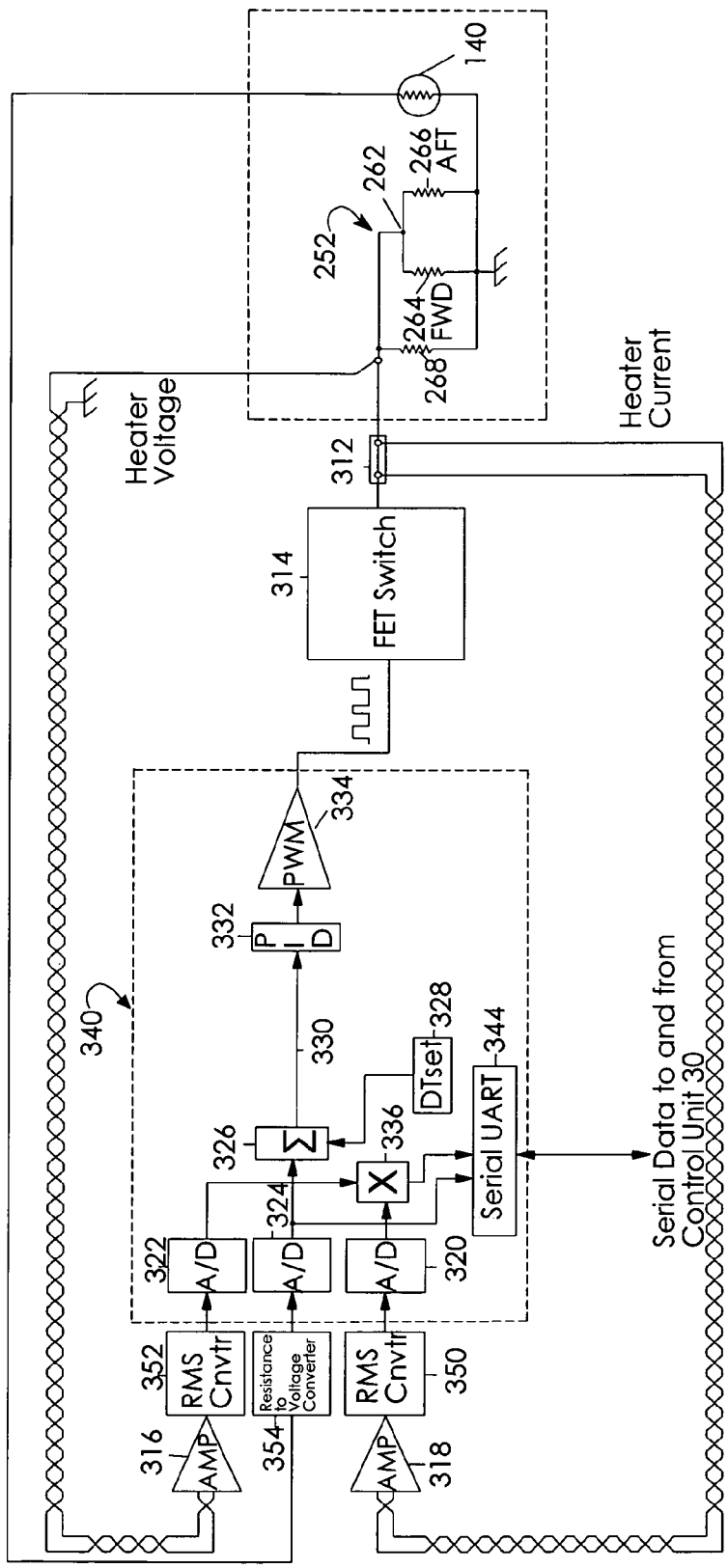
FIG. 5 is a block diagram of a deice temperature control circuit constructed in accordance with the present invention.

The preferred embodiments of the invention provide for two basic temperature control system configurations, namely a control system shown in FIG. 4 that preferably maintains a sensor at 140° C. by controlling the voltage across the sensor, and a control system shown in FIG. 5 that applies power to heaters 268, 264 and 266 to maintain the temperature of the shroud 120, fairing 134 and strut 130 at an average temperature of preferably 50° C. The basic difference between the temperature controllers of FIGS. 4 and 5 is that in the sensor temperature control system shown in FIG. 4, the resistance of the heated sensor is itself an indicator of its temperature whereas in the deice temperature control system of FIG. 5, a thermistor provides a feedback indication of the shroud 120, strut 130 and fairing 134 temperature.

Sensor Control System

Four preferably similar sensor control circuits and software routines are used for each of the sensors 114, 112, 116 and 118. The serial outputs of the control circuits are combined in a multiplexer (not shown) and fed to control unit 30 or 3A for further analysis.

Preferably, the basic operation of all sensor temperature control systems are similar, so only system 208 for medium sensor 112 is described herein, with the others being similarly constructed and the description thereof being omitted for purposes of brevity. However, it should be understood that the sensor temperature control systems do differ in that each includes stored data that characterizes the particular sensor in terms of its temperature-resistance characteristic in a manner suitable for temperature control and the calculation of wet and dry power. Characterization data for each sensor is given in Table 1 and discussed further below.

TABLE 1

|  |  | thin Sensor 114 | Medium Sensor 112 | Scoop Sensor 116 | Comp Sensor 118 |
|---|---|---|---|---|---|
| Sensor Dimensions | Width (mm) | 3.962 | 2.108 | 0.533 | 0.279 |
|  | Length (mm) | 23.622 | 20.447 | 21.590 | 16.764 |
|  | Area (mm²) | 93.590 | 43.102 | 11.507 | 4.684 |
| Sensor resistance as function of room and oil bath temperatures | Room Temp | 53.965 | 32.145 | 24.185 | 76.170 |
|  | 85 | 57.435 | 34.370 | 30.160 | 93.510 |
|  | 100 | 58.345 | 34.865 | 31.815 | 98.270 |
|  | 115 | 59.195 | 35.430 | 33.515 | 103.025 |
|  | 130 | 60.035 | 35.935 | 35.245 | 108.300 |
|  | 145 | 60.855 | 36.455 | 37.025 | 113.145 |
| Characterization of sensor resistance characteristic | Slope (dT/dR) | 17.5783 | 28.6165 | 8.7396 | 3.0416 |
|  | Offset | −925.1580 | −898.3378 | −178.2307 | −199.0406 |
|  | R @ 100° C. (mohm) | 58.3197 | 34.8868 | 31.8357 | 98.3183 |

Figure 6:
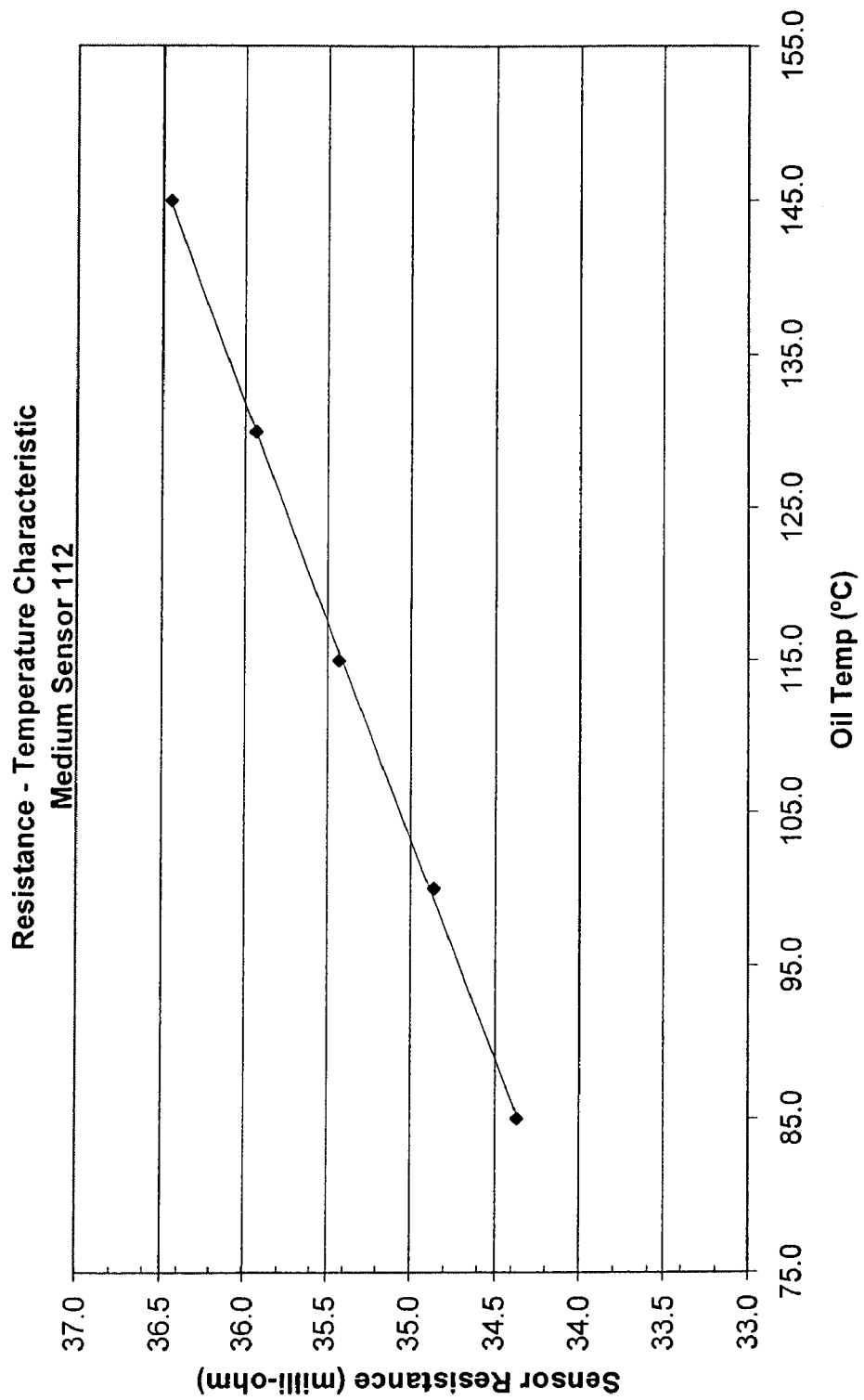
FIG. 6 is an exemplary resistance-temperature characteristic curve for one of the sensors of FIG. 3.

As noted, sensor temperature control system 208 is explained with regard to temperature control of a medium sensor, namely sensor 112. Sensor control system 208 preferably maintains sensor 112 at a constant temperature by increasing or decreasing the power level fed to medium sensor 112 in response to changes of sensor 112's measured resistance. With a fixed power level into sensor 112 and an increasing moisture level in the air flowing through sense module 110, the temperature will tend to drop and will be indicated by a decreasing $R_{sensor}$ of medium sensor 112. Conversely, as the moisture content in airflow passing through sensor module 110 decreases, the temperature of sensor 110 will tend to increase as indicated by an increasing $R_{sensor}$. An exemplary curve showing the relationship between sensor resistance and sensor temperature is shown in FIG. 6. In particular, FIG. 6 gives the relationship for sensor 112, that is preferably determined in a temperature controlled circulating oil bath when sensor 112 is manufactured.

The stored values that characterize a temperature-resistance relationship of medium sensor 112, for example, is characterized by two values, R@100 and dT/dR. The value R@100 gives medium sensor 112 resistance in milliohms at 100° C. while the value dT/dR gives the slope of the temperature vs. resistance line in terms of degrees C. per milliohm. Given the stored values of R@100, dT/dR and a desired operating temperature $ST_{set}$ 228, processor 240 calculates a desired resistance value indicative of the preferred $ST_{set}$ which, in the preferred embodiment, is 140° C. The power necessary to maintain a desired resistance value, and therefore temperature, is controlled by the control system set forth in FIG. 4 and described as follows.

The output from controlled DC-DC converter 214, operating as a power amplifier, preferably ranges between substantially 0 volts up to substantially 3 volts. A voltage across sensor 112 and current through shunt 212, are measured and fed back to processor 240 via voltage amplifier 216 and current amplifier 218 respectively. The outputs of the voltage amplifier 216 and current amplifier 218 are filtered by filters 252 and 254 and fed to Analog to Digital (A/D) converters 220 and 222 where they are converted to digital values. The digital values are preferably supplied to a software routine represented by divider 224 and stored in processor 240 and wherein a substantially instantaneous value of sensor 112's resistance is calculated. Likewise multiplier 236 calculates a power value based on the fed back values of sensor 112's voltage and current to give a value proportional to the power dissipated in sensor 112. The output of multiplier 236 is sent to the control unit 30 or 30A via a serial UART 244.

The output of the divider block 224, is fed to subtractor 226. In subtractor 226 a present value of sensor 112's resistance from divider 224 is compared to $ST_{set}$ and the difference (resistance error signal 230) is fed to PID (Proportional, Integral and Derivative) controller 232. The error 230 is processed by the digital PID control loop which continually calculates a new value to be fed to D/A converter 234, where it is converted to an analog value and amplified by controlled DC to DC converter 214. The output of controlled DC to DC converter 214 is then fed to medium sensor 112 to raise or lower the sensor 112's power level until the average resistance error 230 is zero and sensor 112's temperature is at the preferred value of 140 degrees Centigrade.

PID controllers are often used for closed loop control and are known to those skilled in the art. The basic principle of operation of the PID loop is to output the sum of three terms, P, I, and D, which perform different specific functions. The Proportional, or P, term multiplies the error by a constant and feeds it directly to the sum; if the wire temperature falls below the set point, the P term immediately calls for more power. The Integral, or I, term integrates the error and applies it to the output sum. In this way small errors will accumulate over a period of time so that the average error is zero. The Derivative, or D, term applies a rate feedback term to the output sum to keep the system from overshooting. We have discovered that, in the preferred embodiment of the temperature control systems for thin sensor 114, medium sensor 112, scoop sensor 116 and compensation sensor 118 the D term is not required.

Preferably, D/A 234 has an adjustable minimum voltage setting that sets a minimum power level that will be delivered to medium sensor 112 to prevent divide by zero errors in a resistance calculation of divider 224 of FIG. 4 for example. Preferably, this minimum power level is set low enough to not substantially heat sensor 112 and introduce errors into a power calculation for the determination of wet or dry power and allow for safe operation down to zero airspeed.

Deice Temperature Control System

A deice temperature control system 308 is located in temperature controller 20 and maintains sense module shroud 120, strut 130 and fairing 134 at a substantially constant temperature to control heat loss from thin sensor 112, medium sensor 114, scoop sensor 116 and compensation sensor 118 to the shroud. In the preferred embodiment shroud 120, strut 130 and fairing 134 are at ground potential and form a return path for current through sensors 112, 114, 116 and compensation sensor 118 as well as for heater sections 264 and 266. The return path connection for sensors 112, 114, 116 is through the shroud at region 135 of FIG. 2G and the connection for compensation sensor 118 is made by stud 138 as shown in FIG. 2G.

Deice temperature control system 308 includes deice strut heater 268, shroud heater 252 which is preferably in the form of a heater tape placed between inner shroud portion 126 and outer shroud portions 128. As illustrated in FIGS. 2G and 5, shroud heater 252 comprises fwd heater portion 264 section and aft heater portion 266, both of which are fed by an electrical connection 262 in region 136 as shown in FIG. 2C. In the preferred embodiment, the electrical connection forces the fwd portion 264 of heater 252 (see 2G) to have a lower resistance than aft portion 266 to provide more heat at the forward portion of the shroud which is first cooled by airstream 104. The lower resistance of the fwd section 264 than the resistance of aft section 266 provides that the shroud heater 264 operates at a higher power level then aft heater 266.

Strut heater 268 and heater sections 264 and 266 are preferably connected in parallel and fed by pulse width modulator 314 having a fixed frequency of approximately 895 hz. The temperature of the shroud 120, fairing 134 and strut in the region of thermistor 140 is controlled by feeding back the resistance read at thermistor 140 and adjusting the output of pulse width modulator 314 to maintain thermistor 140 at a constant temperature of preferably 50 degrees C.

One end of thermistor 140 is connected to fairing 135 which is at ground potential and the other end is connected to A/D converter 324 via amplifier 316 and RMS converter 352. A/D converter 324 preferably includes a current source output fed to thermistor 140 to convert the resistance of thermistor 140 into an analog voltage. The analog voltage is converted to its digital equivalent by A/D converter 324.

The output of A/D converter 324 is compared to a desired Deice Temperature Set point (DTset) stored in processor 340 and a difference from subtractor 326 is fed to PID controller 332 and there to pulse width modulator 314. We have found that the "D" term of the PID controller used in the Deice temperature control systems can be useful for maintaining the shroud 120, fairing 134 and strut 130 at a correct temperature because of its greater thermal mass as compared individual sensors 112, 114, 116 and 118.

The power supplied to heaters 268, 264 and 266 is calculated by sensing heater voltage between sense point 262 and ground while current through the heaters is measured by shunt 312. The calculated power as well as the resistance of thermistor is sent to control unit 30 or 30A and is used in the preferred embodiment as a backup indicator of total water content and a measure of the condition of the heaters 268, 264 and 266.

At low or zero airspeed, a minimum amount of deice power is required. As the airspeed increases, or ambient temperature decreases, the amount of deicing power will increase. Furthermore during encounters with liquid water and or ice water, extra power will be delivered by the deice control loop to compensate for the increased cooling of the impinging water. Preferably up to 375 watts of heating power can be provided to the shroud 120, fairing 134 and strut 134 heaters.

Calculation of Water Content

The cooling of compensation sensor 118, by virtue of its orientation, is substantially independent of both the LWC and IWC of the air flowing in airstream 104 through sensor module 110. Thus, the power to hold the compensation sensor 118 at a constant temperature is substantially only a function of the airflow or dry power.

Preferably, the dry power value to subtract from the total power provided to each sensor 112, 114 and 116 is determined using the curves of FIG. 7, which relate the dry power for compensation sensor 118 to a dry power value for each of sensors 112, 114 and 116. For best performance, the curves of FIG. 7 are preferably generated in a wind tunnel with a substantially water free airflow 104. In an alternate embodiment the curves would be generated from thermodynamic considerations.

Water content, whether originating as ice water or liquid water, is measured by measuring the power (wet power) to keep a sensor at a fixed temperature while the water in contact with a sensor is evaporated.

When a droplet of liquid water impacts any of the sensors 112, 114 or 116, two steps are necessary to evaporate the droplet. First the droplet must be heated from its initial temperature to its evaporative temperature, which at standard conditions requires 1 calorie/gram. Then, once at the evaporative temperature, an additional approximately 540 cal/gram (corrected for the evaporative pressure when known), the latent heat of evaporation, will cause the droplet to evaporate.

Likewise it is known from theory that if the water to be evaporated started in a glaciated state (i.e. as ice) as might be the case of the scoop sensor 116, an additional 80 cal/gram would be necessary to convert the ice into water. We have found however that ignoring the 80 cal per gram factor simplifies calculations without having a major influence on results.

As one skilled in the art knows, the temperature at which a droplet begins to rapidly evaporate, $T_{evap}$, depends on ambient pressure and that the latent heat of vaporization depends on the $T_{evap}$ and methods for determining these corrections are therefore not further discussed for purposes of brevity.

The next step in the calculation of liquid water content measured by sensor 112 and 114 and liquid water and or ice water content as measured in scoop sensor 116, is to convert the power dissipated in each of the sensors, after correction for the dry power losses, into grams of water currently being evaporated and then, knowing the projected area of each sensor and true airspeed, into grams per cubic meter. These conversions are expressed in the following equation known to those skilled in the art:

$$LWC\left(\frac{g}{m^3}\right) = \frac{P_{sense,wet} \text{ (watts)} \cdot 2.389 \times 10^5}{\left[L_{evap}\frac{cal}{g} + 1.0\frac{cal}{g \cdot °C}(T_{evap} - T_{ambient})\right] \cdot TAS\frac{m}{s} \cdot L_{sense} \text{ mm} \cdot W_{sense} \text{ mm}}$$

Where:

$P_{sense,wet}$=Wet Power measured by the sense element watts $L_{evap}$=Latent heat of evaporation cal/gm as corrected for evaporative temperature $T_{evap}$=Evaporative temperature in ° C. as corrected for Ambient pressure $T_{ambient}$=Static Ambient temperature in ° C.

$L_{sense}$=Length of the sense element in mm $W_{sense}$=Width of the sense element in mm TAS=True airspeed in m/s The equation above gives the water evaporated by each of the medium sensor 112, thin sensor 114 and scoop sensor 116.

We have confirmed in wind tunnel tests that the design and placement of scoop sensor 116 tends to capture and evaporate liquid water and ice water without affecting the response of the medium or thin sensors 112 and 114. The result is that heat lost from scoop 116, after subtraction of dry power, is a measure of the TWC (the sum of LWC and IWC) in a cloud. Likewise, and as discussed, the powers to keep medium sensor 112 and thin sensor 114 at a constant temperature (after subtraction of the dry power) are measures of the LWC water in airstream 104 through the sensor module 110.

Moreover it is known that larger diameter drop sizes tend not to stick to the thin sensor 114 long enough to evaporate while they do tend to stick to the medium sensor 112. Likewise smaller drops tend to pass around the medium sensor but stick to the thin sensor. This behavior results in different measurements of LWC using medium sensor 112 and thin sensor 114 and this difference is useful in estimating MVD.

The calculations above are performed in Control unit 30 and 30a using power data transmitted from temperature controller 208 via UART 244 as shown in FIG. 4.

Estimation of MVD

Figure 8:
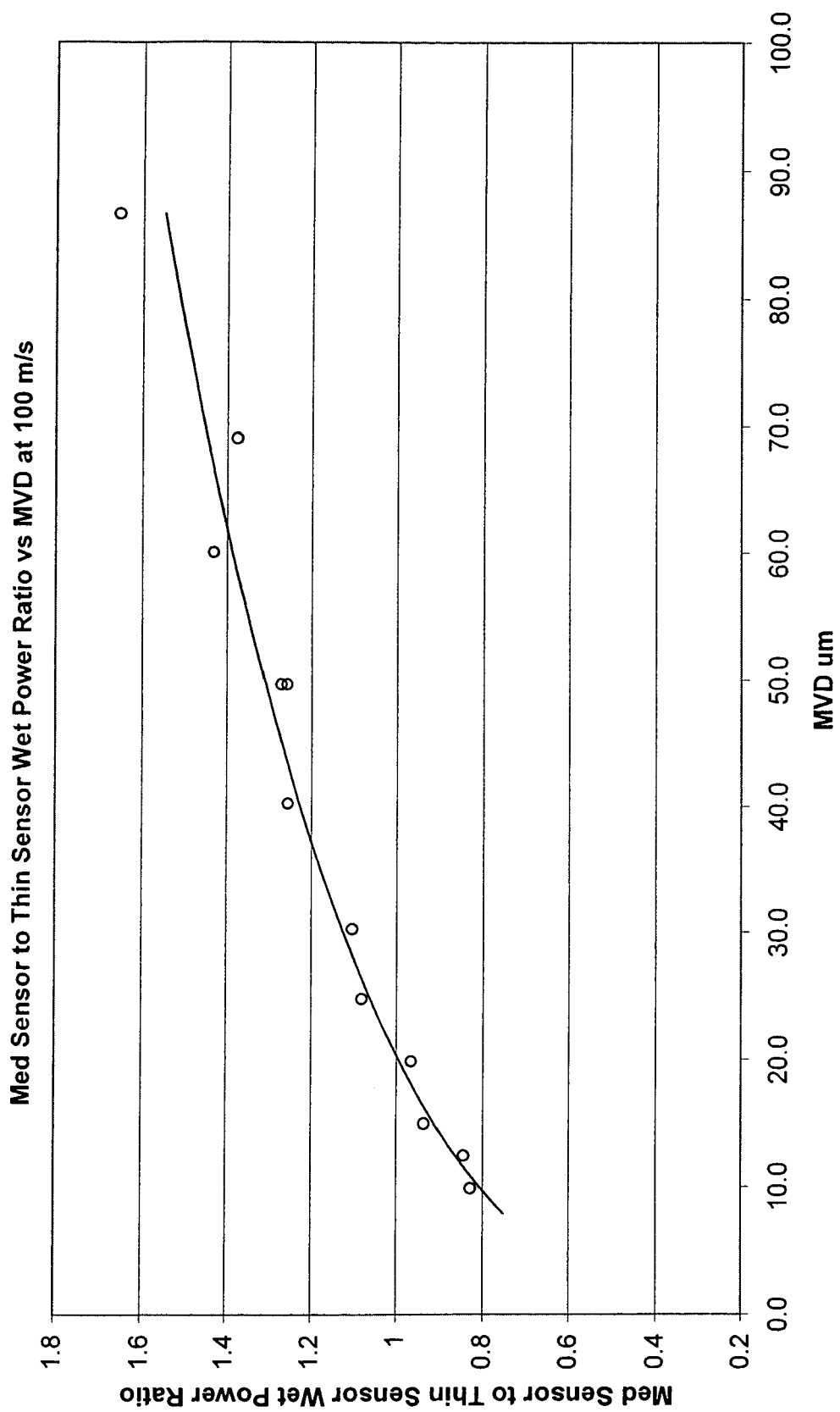
FIG. 8 relates a ratio of sensor wet power to MVD value based on wind tunnel tests.

The difference in response of the medium sensor and thin sensor to droplet size, when expressed as a ratio of wet power of medium sensor 112 to wet power of thin sensor 114, and calibrated in a wind tunnel, has been found to be a repeatable discriminator of the MVD of cloud liquid water. Calibration is accomplish by in a wind tunnel using a calibrated source of known MVD, logging the ratio of wet powers of the medium and thin sensor as a function of MVD and storing the results in EPROM 424 located in Control Unit 30 and 30a and shown in FIGS. 10 and 11. FIG. 8 shows calibration results from wind tunnel measurements for the preferred embodiment at true airspeeds speeds of up to 100 meters per second and MVD's up to 100 microns.

Detection and Measurement of Ice Water

Since the heat loss from the preferred medium sensor 112 and preferred thin sensor 114 do not substantially change in the presence of the ice water but the scoop sensor 116 does show increased heat loss in the presence of liquid water or ice water, the invention uses these response characteristics to discriminate between the presence of the different water phases as described below.

If either the medium sensor 112 or thin sensor 114 show LWC due to moisture AND the TWC from the scoop sensor 116 is greater than the larger of the LWC from the medium sensor 1120R thin sensor 114 then the larger of the LWC calculations from the medium or thin sensor gives a measure of the LWC and the TWC contains both liquid water and ice water, i.e. the cloud is of mixed phase. Subtraction of LWC from TWC gives a measure of the IWC.

If the TWC given by the scoop sensor 116 is substantially equal to the larger of the value from the medium or thin sensor, then the cloud water is substantially all water, the TWC is substantially equal to the LWC.

Moreover, if the scoop indicates heat loss but neither the medium or thin sensor indicates meaningful heat loss due to moisture, then the water in the cloud is substantially all ice water.

An alternate embodiment of the invention provides corrected measurement and detection accuracy of LWC and IWC as follows. The invention sense head 10 is placed in a wind tunnel or other calibrated environment. A LWC ratio is formed by measurement of LWC as measured by thin sensor 114, to a LWC measurement as measured by a wind tunnel reference device and the ratio is recorded as a function of MVD as given by an MVD reference device. In a preferred embodiment, a best fit curve in the form of an exponential is formed using the ratio and MVD values within a spread sheet program. Data representing the best fit curve is preferable stored in the form of a lookup table in the EPROM 424 of control unit 30 or 30a. Test data and a best fit curve in the form of an exponential for thin sensor 114 are provided in FIG. 9.

This same process is repeated for medium sensor 112 and scoop sensor 116.

In a flight environment, the invention calculates initial LWC values from medium sensor 112 and thin sensor 114 based on wet power measurements as previously described, and then selects the higher of the two values storing both the higher value and an indicator of which of the sensors experienced the higher value.

Figure 9:
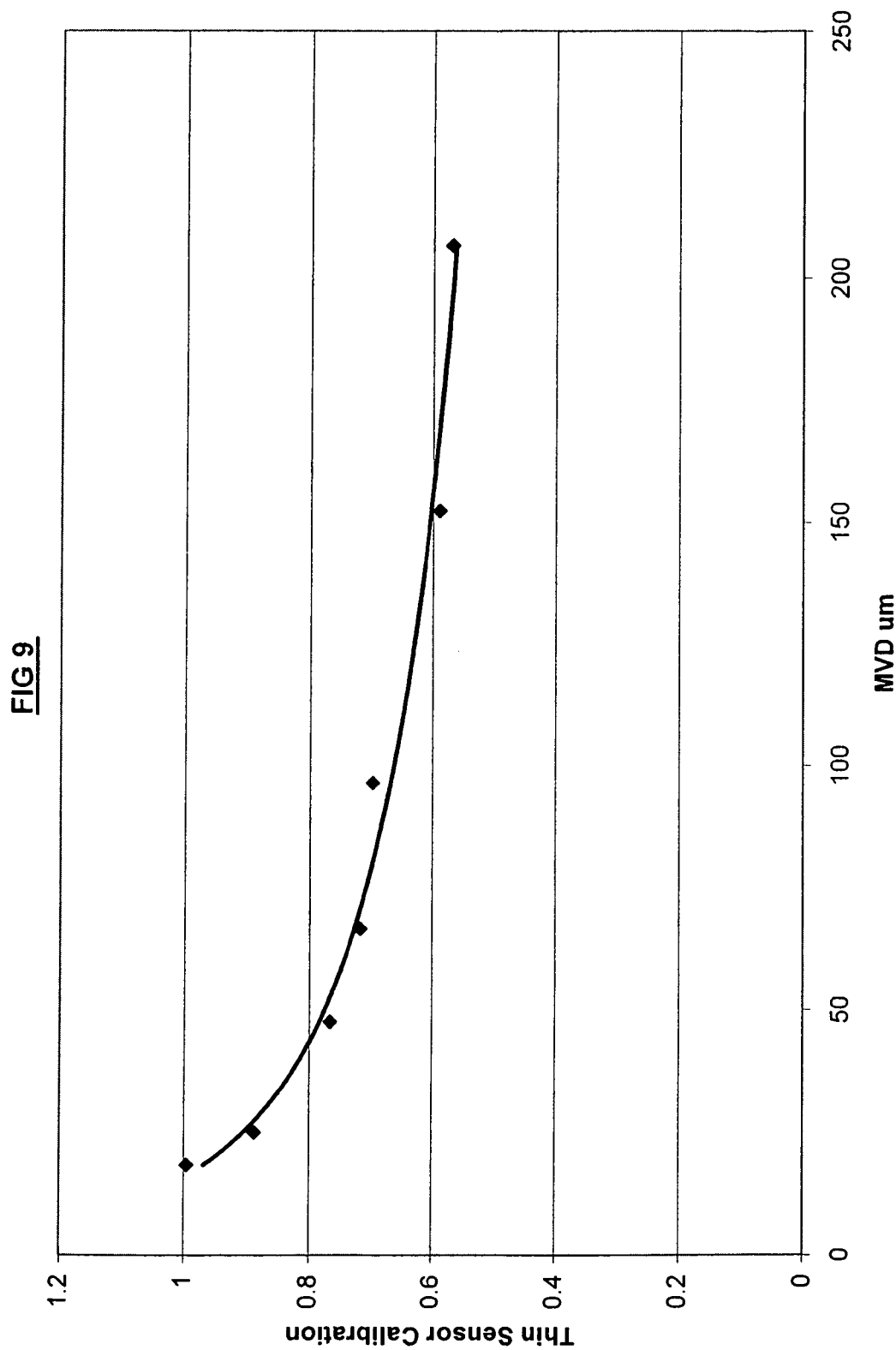
FIG. 9 is an exemplary correction curve to correct liquid water content measured value based on MVD data.

As an example, for a case where thin sensor 114 gives a higher value of LWC, the invention uses a substantially simultaneously determined value of MVD (by the ratio of wet powers of medium sensor 112 to the wet power of thin sensor 114 as a function of MVD curve) to enter a look up table based on FIG. 9 to yield an LWC correction factor. The inverse of this factor is then multiplied by the higher LWC to yield a corrected LWC.

Moreover subtraction of a corrected LWC from TWC gives an improved value of IWC.

Power Fluctuations Due to Approaching Cloud Water or Ice

An alternate embodiment of the invention combines measurement of LWC and IWC using the wet power measurements with information gained from fluctuations of total power for each sensor that are experienced before significant measurements of wet power as described below.

It was observed during testing in both wind tunnels and on-board aircraft that, as the amount of cloud water begins to rise, but prior to there being a significant level of average wet power delivered to either of the medium 112, thin 114 or scoop 116 sensors to establish that the sensor head 10 is actually in a cloud, fluctuations in total power (wet plus dry) to either or all of the medium 112, thin 114 and scoop 116 sensors can increase noticeably.

The rapid response of the sensors 112, 114 and 116 in cooperation with the temperature control systems represented by temperature control system 208 gives changing sensor power values (wet plus dry) in response to random fluctuations in the amount of water intercepted by the sensor. This response, which is estimated to be less 0.01 seconds, is useful even though the cloud is, in general, quite uniform (over a large distance) while having little appreciable water. Said another way, while the average amount of water over a large volume of the cloud may be small, the sensors none the less respond to small pockets of water in the cloud.

Furthermore as the amount of cloud water increases, the power fluctuations diminish and the calculated LWC and IWC measurement indicate the presence of water in either liquid or ice form.

Calculation of Power Fluctuations

In operation, a temperature controller 208, in order to maintain a sensor at a preferred temperature of 140 degrees C., adjusts the power level to the sensor multiple times per second, the preferred rate being twenty to forty times per second.

The presence of pockets of liquid water or ice water is determined (for each sensor) as follows:

1. All the power level samples for a given period of time, typically one second, are averaged together giving an average power level for the particular time period.
2. The average value calculated in Step 1 is subtracted from each individual power sample taken in the time period, giving the departure from average for each power sample.
3. The absolute value of each sample's departure is then calculated. The result is the magnitude of each samples fluctuation around the average
4. An average of all the individual, absolute values is then computed.
5. If the magnitude of this averaged value exceeds the specified threshold value associated with each sensor given below, then the associated sensor is exposed to liquid water and or ice water as indicated.

The steps 1 through 5 are performed for the power values for each of sensors 112, 114 and 116 and the resulting values are used in the display logic given in a paragraph below. It is noted that the magnitude of the power fluctuations developed above are termed: "medium sensor power fluctuations", "thin sensor power fluctuations" and "scoop sensor power fluctuations".

In an alternate embodiment, a Fourier analysis is done on the stream of power level samples to provide an RMS value of the resulting spectrum (with dc term removed) and therefore an indication of the level of power fluctuations.

These calculations of sensor power fluctuations are performed in control units 30 or 30A.

Data Reduction and Display

Data reduction processes and display functions are preferably performed in processor 418 of Control Unit 30 as shown in FIG. 10 and based on power calculations performed in a temperature controller for each sensor representatively displayed by temperature controller 208 shown in FIG. 4. Processor 418 in control unit 30 receives multiplex serial power data 456 from each temperature controller via UART 414 in control unit 30 as well as ambient data 454 from a host aircraft (or wind tunnel facility if appropriate) via an ARINC 429 link. Common data stream 456 also includes power supplied to deice heaters 262, 264 and 266 via UART 414 of FIG. 5. Common stream 456 is formed in a multiplexer (not shown) that combines the outputs of all UARTS represented by UART 244 and UART 344 of FIG. 5.

Processor 418 accesses RAM 420, EPROM 424, which stores calibration data, and ROM 422 having program data stored therein. Processor 418 also provides a signal to cockpit warning indicator light 426 when an unsafe or potentially unsafe condition occurs in flight.

Threshold driven indicators present in control unit 30 and control unit 30a are controlled as follows. Note that like reference numbers refer to similar items and functionality for both control units 30 and 30A.

IWC Indicator 402 illuminates if the result of performing the following logic yields a logical "TRUE" signal:

IF (((Calculated IWC exceeds a specified threshold #1) OR ((Scoop sensor power fluctuations exceed a specified threshold #2) AND (medium sensor power fluctuations do not exceed a specified threshold #3) AND (thin sensor power fluctuations do not exceed specified threshold #4)))

SLD (Super-cooled Large Droplets) Indicator 404 illuminates if the result of performing the following logic yields a logical "TRUE" signal:

IF ((Calculated MVD exceeds a specified threshold #5) AND ((Calculated LWC from the medium sensor exceeds specified threshold #6) OR (Calculated LWC from the thin sensor exceeds a specified threshold #7)) AND (Air temperature is below specified threshold #8))

LWC Indicator 406 illuminates if the result of performing the following logic yields a logical "TRUE" signal:

IF ((Calculated LWC from the medium sensor exceeds specified threshold #9) OR (Calculated LWC from thin sensor exceeds specified threshold #10))

IN Cloud indicator 408 illuminates if the result of performing the following logic yields a logical "TRUE" signal:

IF ((Measured LWC from the thin sensor exceeds specified threshold #11) OR (Measured LWC from the medium sensor exceeds specified threshold #12) OR (Measured TWC from the scoop sensor exceeds specified threshold #13) OR (Thin sensor power fluctuations exceeds specified threshold #14) OR (Medium sensor power fluctuations exceeds specified threshold #15) OR (Scoop sensor power fluctuations exceeds specified threshold #16))

Potential Icing Indicator 410 illuminates if the result of performing the following logic yields a logical "TRUE" signal:

IF ((In Cloud indicator 408 is illuminated) AND (Air temperature is below specified threshold #17))

Where sensor power fluctuations are fluctuations of total power to a sensor, that is, wet power plus dry power and:

threshold #1 is preferably 0.020 gm/m3; threshold #2 is preferably 0.080 watts; threshold #3 is preferably 0.040 watts; threshold #4 is preferably 0.010 watts; threshold #5 is preferably 50.0 um; threshold #6 is preferably 0.020 gm/m3; threshold #7 is preferably 0.020 gm/m3; threshold #8 is preferably +2.0 deg Centigrade; threshold #9 is preferably 0.020 gm/m3; threshold #10 is preferably 0.020 gm/m3; threshold #11 is preferably 0.020 gm/m3; threshold #12 is preferably 0.020 gm/m3; threshold #13 is preferably 0.020 gm/m3; threshold #14 (same as threshold #4) is preferably 0.010 watts; threshold #15 (same as threshold #3) is preferably 0.040 watts; threshold #16 (same as threshold #2) is preferably 0.080 watts; and threshold #17 is preferably +2.0 deg Centigrade.

As one skilled in the art would appreciate, alternate embodiments or modifications to the invention as well as desired false alarm rates could affect a choice of thresholds.

Control Unit 30 includes an LCD display 444 which, in addition to displaying the indicators described above, also provide measurement data in analog form as described as follows. Bar graph 428 indicates MVD over the preferred range of 0-100 microns or alternately in excess of 250 microns. Bar graphs 430, 432, 434 and 436 indicates IWC, TWC (from Scoop sensor 116) LWC from medium sensor 112 and thin sensor 114 over a preferred range of about 0 to about 3 g/m$^3$ and alternative over the range of about 0 to about 5 g/m$^3$. Control unit 30 also includes time history 442 to shown present and past values of TWC, IWC and the larger of LWC measured by the medium sensor or thin sensors.

Control Unit 30 is preferably used in a research environment such as a research aircraft or wind tunnel facility. In a commuter, commercial, private or military aircraft an alternate embodiment as shown in FIG. 11 at 30A is preferred. The primary difference between the embodiments 30 and 30A is that in control unit 30 only the threshold indicators 402, 404, 406, 408 and 410 are used. In addition, processor 418 of control unit 30 and shown in FIG. 10 preferrably has increased processing power/speed when compared to processor 416 of control unit 30A to accommodate calculations needed to control the display of measured values.

It can thus be seen that the present invention provides an improved system and method for the calculation of cloud parameters previously only possible by using multiple instruments on research aircraft. In particular, the present invention provides an improved system and method for providing a statistical measure of the size of liquid water droplets, for detection and/or measurement of the presence of a cloud and/or LWC, IWC and SLD parameters; for overcoming difficulties of duplicating cloud conditions, and MVD in particular, in wind tunnel testing; as well as an improved system that is lightweight and suitable for use on non-research aircraft.

For example, it can thus be seen that in one preferred embodiment, the present invention is directed to a system for determining a measure of cloud water droplet size based on sensor cooling by cloud water and stored sensor power ratio and droplet size data, the system comprising a first and second temperature controlled co-located self heated sensors, the cooling of the sensors being substantially independent of ice water; a self heated compensation sensor oriented to be substantially independent of cloud water cooling; a variable power source coupled to each first and second sensor for keeping each sensor at a temperature and each having a measurable output power; a variable power source coupled to the compensation sensor for keeping the sensor at a temperature and having a measurable output power; and a control unit for correcting the measured power to each of the first and second sensors to reflect only heat loss due to cloud water by subtracting from the measured power an adjusted compensation sensor measured value; and forming a ratio of corrected power of each of the first and second sensors to identify a liquid water droplet size based on the stored power ratio and droplet size data.

In another embodiment, the present invention is directed to a system for measuring water droplet size in a cloud, wherein the system comprises a sensor head comprising a first heated sensor having a resistance characteristic that is temperature dependent, wherein power loss from the sensor is at least essentially not affected by the presence of ice water in an airflow thereacross; a second heated sensor having a second resistance characteristic that is temperature dependent, wherein power loss from the second sensor is at least essentially not affected by the presence of ice water in the airflow thereacross; a heated compensation sensor being positioned to be responsive to the airflow thereacross and having a power loss at least essentially not affected by the presence of liquid water or ice water in the airflow thereacross; a respective temperature controller associated with each of the first sensor, second sensor and compensation sensor, each of which for maintaining the temperature of the respective sensors at respective temperature values using its temperature dependent resistance characteristic, wherein, for each of the first and second sensors, the respective controller maintains the sensor at the temperature value by adjusting a power level fed to the sensor; calculates the total power required to maintain the sensor at the temperature value when the sensor is exposed to an airflow comprising at least one of liquid water and ice water; and a control unit for receiving power levels from each of the first sensor and second sensor; subtracting, from each total power calculation, a dry power component determined from the power required to maintain the compensation sensor at its temperature value in the presence of the airflow comprising at least liquid water, thereby arriving at a wet power value attributable to the incremental power associated with maintaining the respective first and second sensors at the respective temperature values in the presence of at least liquid water in the airflow; and for forming a ratio of the wet power value of the first sensor to the wet power value of the second sensor to obtain an estimated value of the measure of water droplet size in the cloud from a predetermined calibrated relationship of wet power ratio to water droplet sizes.

In yet another embodiment, the present invention is directed to a system for determining liquid water content in a cloud, wherein the system comprises a sensor head comprising a first heated sensor having a first resistance characteristic that is temperature dependent, wherein the first sensor is at least essentially not affected by the presence of ice water in an airflow thereacross; a second heated sensor having a second resistance characteristic that is temperature dependent, wherein the second sensor is at least essentially not affected by the presence of ice water in the airflow thereacross; a heated compensation sensor being positioned to be responsive to the airflow thereacross and at least essentially not affected by the presence of liquid water or ice water in the airflow thereacross; a respective temperature controller associated with each of the first sensor, second sensor and compensation sensor, each of which for maintaining the temperature of the respective sensors at respective temperature values using its temperature dependent resistance characteristic, wherein, for each of the first and second sensors the respective controller maintains the sensor at the temperature value by adjusting a power level fed to the sensor; calculates the total power required to maintain the sensor at the temperature value when the sensor is exposed to an airflow comprising at least liquid water; and a control unit for receiving power levels from each of the first sensor and second sensor; subtracting, from each total power calculation, a dry power component determined from the power required to maintain the compensation sensor at its temperature value in the presence of the airflow thereby arriving at a wet power value attributable to the incremental power associated with maintaining the respective first and second sensors at the respective temperature values in the presence of at least liquid water in the airflow; and calculating a liquid water content for the first sensor and sensor wet power values and selecting the higher LWC as the desired liquid water content.

In still another embodiment of the present invention, a system is provided for determining liquid water content in a cloud, the liquid water having a determined droplet size, wherein the system comprises a sensor head comprising a first heated sensor having a first resistance characteristic that is temperature dependent, wherein the first sensor is at least essentially not affected by the presence of ice water in an airflow thereacross; a second heated sensor having a second resistance characteristic that is temperature dependent, wherein the second sensor is at least essentially not affected by the presence of ice water in the airflow thereacross; a heated compensation sensor being positioned to be responsive to the airflow thereacross and at least essentially not affected by the presence of liquid water or ice water in the airflow thereacross; a respective temperature controller associated with each of the first sensor, second sensor and compensation sensors, each of which for maintaining the temperature of the respective sensors at respective temperature values using its temperature dependent resistance characteristic, wherein, for each of the first and second sensors the respective controller maintains the sensor at the temperature value by adjusting a power level fed to the sensor; calculates the total power required to maintain the sensor at the temperature value when the sensor is exposed to an airflow comprising at least liquid water; and a control unit for receiving power levels from each of the first sensor and second sensor and having a stored droplet size verses liquid water content correction curve for each first and second sensor; subtracting, from each total power calculation, a dry power component determined from the power required to maintain the compensation sensor at its temperature value in the presence of the airflow thereby arriving at a wet power value attributable to the incremental power associated with maintaining the respective first and second sensors at the respective temperature values in the presence of liquid water in the airflow; and calculating a liquid water content for the first sensor and second sensor wet power values, selects the higher of the calculated liquid water content values, and corrects the higher of the two values using a droplet size verses liquid water content correction curve.

In yet another embodiment, a system is provided for determining the presence of ice water in an airflow, wherein the system comprises a sensor head comprising a first heated sensor having a first resistance characteristic that is temperature dependent, wherein heat the from first sensor is at least essentially not affected by the presence of ice water in the airflow thereacross; a second heated sensor having a second resistance characteristic that is temperature dependent, wherein heat from the second sensor is at least essentially not affected by the presence of ice water in the airflow thereacross; a third heated sensor having a third resistance characteristic that is temperature dependent, wherein heat loss from the third sensor is affected by a presence of ice water in the airflow thereacross; a heated compensation sensor being positioned to be responsive to the airflow thereacross and having a heat loss least essentially not affected by the presence of liquid water or ice water in the airflow thereacross; a respective temperature controller associated with each of the first sensor, second sensor, third sensor and compensation sensors, each of which for maintaining the temperature of the respective sensors at respective temperature values using its temperature dependent resistance characteristic, wherein, for each of the first, second and third sensors, the respective controller maintains the sensor at the temperature value by adjusting a power level fed to the sensor; calculates the total power required to maintain the sensor at the temperature value when the sensor is exposed to an airflow comprising at least ice water; and a control unit for receiving power levels from each of the first sensor and second sensor; subtracting, from each total power calculation, a dry power component determined from the power required to maintain the compensation sensor at its temperature value in the presence of the airflow comprising at least ice water, thereby arriving at a wet power value attributable to the incremental power associated with maintaining the respective first, second and third sensors at the respective temperature values in the presence of at least ice water in the airflow; and calculating a water content measurement for the first sensor, second sensor and third sensor wet power values, selecting a higher water content value from the first and second sensor and subtracting the higher value from the water content value of the third sensor to indicate a presence of ice water.

In still another embodiment, a system is provided for warning of cloud water, the system comprising a first temperature controlled self heated sensor, a variable power source for the first sensor having a measurable output power responsive to changes in cloud water; a processor for averaging the measured output power of the power source and subtracting a substantially instantaneous measure of the output power of the power source to determine fluctuations around the average; and comparing the fluctuations to a threshold indicative of the presence of cloud water.

In still further embodiments, the aforementioned constructions could be modified by those skilled in the art while remaining within the scope of the present invention. Thus, the invention generally covers means for carrying out the aforementioned functionality. For example, a single controller or control unit could carry out the aforementioned functionality if so desired, and therefore, the invention is not limited by the specific construction set forth above.

As should now be seen, the present invention is also directed to a plurality of methodologies. For example, in accordance with a first embodiment, a method for determining a measure of cloud water droplet size based on sensor cooling by cloud water and stored sensor power ratio and droplet size data, utilizing a system comprising a first and second temperature controlled co-located self heated sensors, the cooling of the sensors being substantially independent of ice water, a self heated compensation sensor oriented to be substantially independent of cloud water cooling; a variable power source coupled to each first and second sensor for keeping each sensor at a temperature and each having a measurable output power; and a variable power source coupled to the compensation sensor for keeping the sensor at a temperature and having a measurable output power, wherein the method comprises the steps of correcting the measured power to each of the first and second sensors to reflect only heat loss due to cloud water by subtracting from the measured power an adjusted compensation sensor measured value; and forming a ratio of corrected power of each of the first and second sensors to identify a liquid water droplet size based on the stored power ratio and droplet size data.

In yet another embodiment, the present invention is directed to a method of measuring water droplet size in an airflow, utilizing a system comprising a sensor head comprising a first heated sensor having a resistance characteristic that is temperature dependent, wherein power loss from the sensor is at least essentially not affected by the presence of ice water in the airflow thereacross; a second heated sensor having a second resistance characteristic that is temperature dependent, wherein power loss from the second sensor is at least essentially not affected by the presence of ice water in the airflow thereacross; a heated compensation sensor being positioned to be responsive to the airflow thereacross and having a power loss at least essentially not affected by the presence of liquid water or ice water in the airflow thereacross, wherein the method comprises the steps of maintaining the temperature of the respective sensors at respective temperature values using its temperature dependent resistance characteristic; and wherein, for each of the first and second sensors, the method comprises the steps of maintaining the sensor at the temperature value by adjusting a power level fed to the sensor and calculating the total power required to maintain the sensor at the temperature value when the sensor is exposed to an airflow comprising at least one of liquid water and ice water; wherein the method further comprises the steps of receiving power levels from each of the first sensor and second sensor; subtracting, from each total power calculation, a dry power component determined from the power required to maintain the compensation sensor at its temperature value in the presence of the airflow comprising at least liquid water, thereby arriving at a wet power value attributable to the incremental power associated with maintaining the respective first and second sensors at the respective temperature values in the presence of at least liquid water in the airflow; and forming a ratio of the wet power value of the first sensor to the wet power value of the second sensor to obtain an estimated value of the measure of water droplet size in the cloud from a predetermined calibrated relationship of wet power ratio to water droplet sizes.

In still yet another embodiment, a method is provided for determining liquid water content in an airflow, utilizing a system comprising a sensor head comprising a first heated sensor having a first resistance characteristic that is temperature dependent, wherein the first sensor is at least essentially not affected by the presence of ice water in an airflow thereacross; a second heated sensor having a second resistance characteristic that is temperature dependent, wherein the second sensor is at least essentially not affected by the presence of ice water in the airflow thereacross; a heated compensation sensor being positioned to be responsive to the airflow thereacross and at least essentially not affected by the presence of liquid water or ice water in the airflow thereacross; wherein the method comprises the steps of maintaining the temperature of the respective sensors at respective temperature values using its temperature dependent resistance characteristic, maintaining the sensors at the temperature value by adjusting a power level fed to the sensor; calculating the total power required to maintain the sensor at the temperature value when the sensor is exposed to an airflow comprising at least liquid water; receiving power levels from each of the first sensor and second sensor; subtracting, from each total power calculation, a dry power component determined from the power required to maintain the compensation sensor at its temperature value in the presence of the airflow thereby arriving at a wet power value attributable to the incremental power associated with maintaining the respective first and second sensors at the respective temperature values in the presence of at least liquid water in the airflow; and calculating a liquid water content for the first sensor and sensor wet power values and selecting the higher LWC as the desired liquid water content.

Still in another embodiment, a method is provided for determining liquid water content in an airflow, the liquid water having a determined droplet size, utilizing a system comprising a sensor head comprising a first heated sensor having a first resistance characteristic that is temperature dependent, wherein the first sensor is at least essentially not affected by the presence of ice water in an airflow thereacross; a second heated sensor having a second resistance characteristic that is temperature dependent, wherein the second sensor is at least essentially not affected by the presence of ice water in the airflow thereacross; a heated compensation sensor being positioned to be responsive to the airflow thereacross and at least essentially not affected by the presence of liquid water or ice water in the airflow thereacross; wherein the method comprises the steps of maintaining the temperature of the respective sensors at respective temperature values using its temperature dependent resistance characteristic and, for each of the first and second sensors, maintaining maintains the sensor at the temperature value by adjusting a power level fed to the sensor and calculating the total power required to maintain the sensor at the temperature value when the sensor is exposed to an airflow comprising at least liquid water; wherein the method further comprises the steps of receiving power levels from each of the first sensor and second sensor and having a stored droplet size verses liquid water content correction curve for each first and second sensor; subtracting, from each total power calculation, a dry power component determined from the power required to maintain the compensation sensor at its temperature value in the presence of the airflow thereby arriving at a wet power value attributable to the incremental power associated with maintaining the respective first and second sensors at the respective temperature values in the presence of liquid water in the airflow; and calculating a liquid water content for the first sensor and second sensor wet power values, selects the higher of the calculated liquid water content values, and corrects the higher of the two values using a droplet size verses liquid water content correction curve.

In yet another embodiment, a method is provided for determining the presence of ice water in an airflow, utilizing a system comprising a sensor head comprising a first heated sensor having a first resistance characteristic that is temperature dependent, wherein heat the from first sensor is at least essentially not affected by the presence of ice water in the airflow thereacross; a second heated sensor having a second resistance characteristic that is temperature dependent, wherein heat from the second sensor is at least essentially not affected by the presence of ice water in the airflow thereacross; a third heated sensor having a third resistance characteristic that is temperature dependent, wherein heat loss from the third sensor is affected by a presence of ice water in the airflow thereacross; a heated compensation sensor being positioned to be responsive to the airflow thereacross and having a heat loss least essentially not affected by the presence of liquid water or ice water in the airflow thereacross; wherein the method comprises the steps of maintaining the temperature of the respective sensors at respective temperature values using its temperature dependent resistance and wherein, for each of the first, second and third sensors, maintaining the sensor at the temperature value by adjusting a power level fed to the sensor and calculating the total power required to maintain the sensor at the temperature value when the sensor is exposed to an airflow comprising at least ice water; wherein the method further comprises the steps of receiving power levels from each of the first sensor and second sensor; subtracting, from each total power calculation, a dry power component determined from the power required to maintain the compensation sensor at its temperature value in the presence of the airflow comprising at least ice water, thereby arriving at a wet power value attributable to the incremental power associated with maintaining the respective first, second and third sensors at the respective temperature values in the presence of at least ice water in the airflow; and calculating a water content measurement for the first sensor, second sensor and third sensor wet power values, selecting a higher water content value from the first and second sensor and subtracting the higher value from the water content value of the third sensor to indicate a presence of ice water.

In still another preferred embodiment of the present invention, a method is provided for warning of cloud water using a first temperature controlled self heated sensor and a variable power source for the first sensor having a measurable output power responsive to changes in cloud water, wherein the method comprises the steps of averaging the measured output power of the power source; subtracting a substantially instantaneous measure of the output power of the power source to determine fluctuations around the average; and comparing the fluctuations to a threshold indicative of the presence of cloud water.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall therebetween.

What is claimed is:

1. A system for determining a measure of liquid water droplet size based on sensor cooling by cloud water and stored sensor power ratio and droplet size data, said system comprising:
    first and second temperature controlled co-located self heated sensors, the cooling of said sensors being substantially independent of ice water;
    a self heated compensation sensor oriented to be substantially independent of cloud water cooling;
    a variable power source coupled to each of the first and second sensors for keeping each sensor at a predetermined temperature and each variable power source having an output power;
    a variable power source coupled to the compensation sensor for keeping the sensor at a predetermined temperature and having an output power; and
    a control unit for:
        correcting a measured power to each of the first and second sensors to reflect only heat loss due to cloud water by subtracting from the measured power to each of the first and second sensors adjusted compensation sensor measured values; and
        forming a ratio of corrected power of each of the first and second sensors to identify a liquid water droplet size based on the stored sensor power ratio and droplet size data.

2. A system for measuring water droplet size in a cloud, wherein the system comprises:
    a sensor head comprising:
        a first heated sensor having a resistance characteristic that is temperature dependent, wherein power loss from the sensor is at least essentially not affected by the presence of ice water in an airflow thereacross;
        a second heated sensor having a second resistance characteristic that is temperature dependent, wherein power loss from the second sensor is at least essentially not affected by the presence of ice water in the airflow thereacross;
        a heated compensation sensor being positioned to be responsive to the airflow thereacross and having a power loss at least essentially not affected by the presence of liquid water or ice water in the airflow thereacross;
    a respective temperature controller associated with each of the first sensor, second sensor and compensation sensor, each of which for maintaining the temperature of the respective sensors at respective temperature values using each sensor's temperature dependent resistance characteristic, wherein, for each of the first and second sensors, the respective controller:
        maintains the sensor at the temperature value by adjusting a power level fed to the sensor;
        calculates the total power required to maintain the sensor at the temperature value when said sensor is exposed to an airflow comprising at least one of liquid water and ice water; and
    a control unit for:
        receiving power levels from each of the first sensor and second sensor;
        subtracting, from each total power calculation, a dry power component determined from the power required to maintain the compensation sensor's temperature value in the presence of the airflow comprising at least liquid water, thereby arriving at a wet power value attributable to an incremental power associated with maintaining the respective first and second sensors at the respective temperature values in the presence of at least liquid water in the airflow; and
        forming a ratio of the wet power value of the first sensor to the wet power value of the second sensor to obtain an estimated value of the measure of water droplet size in the cloud from a predetermined calibrated relationship of wet power ratios to water droplet sizes.

3. A system for determining liquid water content in a cloud, wherein the system comprises:
    a sensor head comprising:

a first heated sensor having a first resistance characteristic that is temperature dependent, wherein the first sensor is at least essentially not affected by the presence of ice water in an airflow thereacross;
a second heated sensor having a second resistance characteristic that is temperature dependent, wherein the second sensor is at least essentially not affected by the presence of ice water in the airflow thereacross;
a heated compensation sensor being positioned to be responsive to the airflow thereacross and at least essentially not affected by the presence of liquid water or ice water in the airflow thereacross;
a respective temperature controller associated with each of the first sensor, second sensor and compensation sensor, each of which for maintaining the temperature of the respective sensors at respective temperature values using the respective sensors' temperature dependent resistance characteristic, wherein, for each of the first and second sensors the respective controller:
maintains the sensor at the temperature value by adjusting a power level fed to the sensor;
calculates the total power required to maintain the sensor at the temperature value when said sensor is exposed to an airflow comprising at least liquid water; and
a control unit for:
receiving power levels from each of the first sensor and second sensor;
subtracting, from each total power calculation, a dry power component determined from the power required to maintain the compensation sensor's temperature value in the presence of the airflow thereby arriving at a wet power value attributable to an incremental power associated with maintaining the respective first and second sensors at the respective temperature values in the presence of at least liquid water in the airflow; and
calculating a liquid water content for the first and second sensor wet power values and selecting a higher LWC as the determined liquid water content.

4. A system for determining liquid water content in a cloud, said liquid water having a determined droplet size, wherein the system comprises:
a sensor head comprising:
a first heated sensor having a first resistance characteristic that is temperature dependent, wherein the first sensor is at least essentially not affected by the presence of ice water in an airflow thereacross;
a second heated sensor having a second resistance characteristic that is temperature dependent, wherein the second sensor is at least essentially not affected by the presence of ice water in the airflow thereacross;
a heated compensation sensor being positioned to be responsive to the airflow thereacross and at least essentially not affected by the presence of liquid water or ice water in the airflow thereacross;
a respective temperature controller associated with each of the first sensor, second sensor and compensation sensors, each of which for maintaining the temperature of the respective sensors at respective temperature values using the respective sensors' temperature dependent resistance characteristic, wherein, for each of the first and second sensors the respective controller:
maintains the sensor at the temperature value by adjusting a power level fed to the sensor;
calculates the total power required to maintain the sensor at the temperature value when said sensor is exposed to an airflow comprising at least liquid water; and
a control unit for:
receiving power levels from each of the first sensor and second sensor and having a stored droplet size verses liquid water content correction curve for each first and second sensor;
subtracting, from each total power calculation, a dry power component determined from the power required to maintain the compensation sensor at the compensation sensor's temperature value in the presence of the airflow thereby arriving at a wet power value attributable to an incremental power associated with maintaining the respective first and second sensors at the respective temperature values in the presence of liquid water in the airflow; and
calculating a liquid water content value for the first sensor and second sensor wet power values, selecting the higher of the calculated liquid water content values, and correcting the higher value using a droplet size verses liquid water content correction curve.

5. A system for determining the presence of ice water in an airflow, wherein the system comprises:
a sensor head comprising:
a first heated sensor having a first resistance characteristic that is temperature dependent, wherein heat from the first sensor is at least essentially not affected by the presence of ice water in the airflow thereacross;
a second heated sensor having a second resistance characteristic that is temperature dependent, wherein heat from the second sensor is at least essentially not affected by the presence of ice water in the airflow thereacross;
a third heated sensor having a third resistance characteristic that is temperature dependent, wherein heat loss from the third sensor is affected by a presence of ice water in the airflow thereacross;
a heated compensation sensor being positioned to be responsive to the airflow thereacross and having a heat loss least essentially not affected by the presence of liquid water or ice water in the airflow thereacross;
a respective temperature controller associated with each of the first sensor, second sensor, third sensor and compensation sensor, each of which for maintaining the temperature of the respective sensors at respective temperature values using the respective sensors' temperature dependent resistance characteristic, wherein, for each of the first, second and third sensors, the respective controller:
maintains the sensor at the temperature value by adjusting a power level fed to the sensor;
calculates the total power required to maintain the sensor at the temperature value when said sensor is exposed to an airflow comprising at least ice water; and
a control unit for:
receiving power levels from each of the first sensor and second sensor;
subtracting, from each total power calculation, a dry power component determined from the power required to maintain the compensation sensor at the compensation sensor's temperature value in the presence of the airflow comprising at least ice water, thereby arriving at a wet power value attributable to an incremental power associated with maintaining the respective first, second and third sensors at the respective temperature values in the presence of at least ice water in the airflow; and
calculating a water content measurement for the first sensor, second sensor and third sensor wet power values, selecting a higher water content value from the first and second sensor and subtracting the higher value from the water content value of the third sensor to indicate a presence of ice water.

6. The system as claimed in claim 5, wherein if the difference between the higher water content value and the water content value of the third sensor is greater than a threshold, then ice water is present.

7. The system as claimed in claim 5, wherein the difference between the higher water content value and the water content value is a measure of the amount of ice water present.

8. A system for warning of being in a cloud, said system comprising:
   at least one temperature controlled self heated sensor,
   a variable power source for the at least one sensor, the variable power source having an output power responsive to changes in cloud water;
   a processor for averaging the output power of the variable power source and subtracting a substantially instantaneous measure of the output power of the variable power source to determine fluctuations around said average; comparing said fluctuations to a threshold associated with the at least one sensor indicative of the presence of cloud water and indicating when the threshold is exceeded.

9. The system as claimed in claim 8, wherein the sensor is responsive to changes in liquid water only and the threshold is associated with the presence of liquid water.

10. The system as claimed in claim 8, wherein the sensor is responsive to changes in liquid and ice water and the threshold is associated with the presence of ice water and liquid water.

11. The system as claimed in claim 8, wherein the fluctuations are determined using a frequency content analysis.

12. A system for determining a measure of liquid water droplet size based on sensor cooling by cloud water and stored sensor power ratio and droplet size data, said system comprising:
   a first and second temperature controlled co-located self heated sensors, the cooling of said sensors being substantially independent of ice water;
   a self heated compensation sensor oriented to be substantially independent of cloud water cooling;
   controller means for:
      keeping each of the first and second sensors at a predetermined temperature and each sensor having an input power;
      keeping the compensation sensor at a predetermined temperature and having an input power;
      correcting a measured power to each of the first and second sensors to reflect only heat loss due to cloud water by subtracting from the measured power to each of the first and second sensors adjusted compensation sensor measured values; and
      forming a ratio of corrected power of each of the first and second sensors to identify a liquid water droplet size based on the stored sensor power ratio and droplet size data.

13. A system for measuring water droplet size in a cloud, wherein the system comprises:
   a sensor head comprising:
      a first heated sensor having a resistance characteristic that is temperature dependent, wherein power loss from the sensor is at least essentially not affected by the presence of ice water in an airflow thereacross;
      a second heated sensor having a second resistance characteristic that is temperature dependent, wherein power loss from the second sensor is at least essentially not affected by the presence of ice water in the airflow thereacross;
      a heated compensation sensor being positioned to be responsive to the airflow thereacross and having a power loss at least essentially not affected by the presence of liquid water or ice water in the airflow thereacross;
   a first controller means associated with each of the first sensor, second sensor and compensation sensor, for maintaining the temperature of the respective sensors at respective temperature values using the respective sensors' temperature dependent resistance characteristic, wherein, for each of the first and second sensors, the first controller means maintains the sensor at the temperature value by adjusting a power level fed to the sensor and calculates the total power required to maintain the sensor at the temperature value when said sensor is exposed to an airflow comprising at least one of liquid water and ice water; and
   a second controller means for:
      receiving power levels from each of the first sensor and second sensor;
      subtracting, from each total power calculation, a dry power component determined from the power required to maintain the compensation sensor at the compensation sensor's temperature value in the presence of the airflow comprising at least liquid water, thereby arriving at a wet power value attributable to an incremental power associated with maintaining the respective first and second sensors at the respective temperature values in the presence of at least liquid water in the airflow; and
      forming a ratio of the wet power value of the first sensor to the wet power value of the second sensor to obtain an estimated value of the measure of water droplet size in the cloud from a predetermined calibrated relationship of wet power ratios to water droplet sizes.

14. A system for determining liquid water content in a cloud, wherein the system comprises:
   a sensor head comprising:
      a first heated sensor having a first resistance characteristic that is temperature dependent, wherein the first sensor is at least essentially not affected by the presence of ice water in an airflow thereacross;
      a second heated sensor having a second resistance characteristic that is temperature dependent, wherein the second sensor is at least essentially not affected by the presence of ice water in the airflow thereacross;
      a heated compensation sensor being positioned to be responsive to the airflow thereacross and at least essentially not affected by the presence of liquid water or ice water in the airflow thereacross;
   a first controller means associated with each of the first sensor, second sensor and compensation sensor, for maintaining the temperature of the respective sensors at respective temperature values using the respective sensors' temperature dependent resistance characteristic, wherein, for each of the first and second sensors the sensor is maintained at the temperature value by adjusting a power level fed to the sensor; and the total power required to maintain the sensor at the temperature value when said sensor is exposed to an airflow comprising at least liquid water is calculated; and
   a second controller means for:
      receiving power levels from each of the first sensor and second sensor;

subtracting, from each total power calculation, a dry power component determined from the power required to maintain the compensation sensor's temperature value in the presence of the airflow thereby arriving at a wet power value attributable to an incremental power associated with maintaining the respective first and second sensors at the respective temperature values in the presence of at least liquid water in the airflow; and calculating a liquid water content for the first and second sensor wet power values and selecting a higher LWC as the determined liquid water content.

15. A system for determining liquid water content in a cloud, said liquid water having a determined droplet size, wherein the system comprises:

a sensor head comprising:

a first heated sensor having a first resistance characteristic that is temperature dependent, wherein the first sensor is at least essentially not affected by the presence of ice water in an airflow thereacross;

a second heated sensor having a second resistance characteristic that is temperature dependent, wherein the second sensor is at least essentially not affected by the presence of ice water in the airflow thereacross;

a heated compensation sensor being positioned to be responsive to the airflow thereacross and at least essentially not affected by the presence of liquid water or ice water in the airflow thereacross;

a first controller means associated with each of the first sensor, second sensor and compensation sensors, each of which for maintaining the temperature of the respective sensors at respective temperature values using the respective sensors' temperature dependent resistance characteristic, wherein, for each of the first and second sensors the means maintains the sensor at the temperature value by adjusting a power level fed to the sensor and calculates the total power required to maintain the sensor at the temperature value when said sensor is exposed to an airflow comprising at least liquid water; and a second controller means for:

receiving power levels from each of the first sensor and second sensor and having a stored droplet size verses liquid water content correction curve for each first and second sensor;

subtracting, from each total power calculation, a dry power component determined from the power required to maintain the compensation sensor at the compensation sensor's temperature value in the presence of the airflow thereby arriving at a wet power value attributable to an incremental power associated with maintaining the respective first and second sensors at the respective temperature values in the presence of liquid water in the airflow; and calculating a liquid water content value for the first sensor and second sensor wet power values, selecting the higher of the calculated liquid water content values, and correcting the higher value using a droplet size verses liquid water content correction curve.

16. A system for determining the presence of ice water in an airflow, wherein the system comprises:

a sensor head comprising:

a first heated sensor having a first resistance characteristic that is temperature dependent, wherein heat from the first sensor is at least essentially not affected by the presence of ice water in the airflow thereacross;

a second heated sensor having a second resistance characteristic that is temperature dependent, wherein heat from the second sensor is at least essentially not affected by the presence of ice water in the airflow thereacross;

a third heated sensor having a third resistance characteristic that is temperature dependent, wherein heat loss from the third sensor is affected by a presence of ice water in the airflow thereacross;

a heated compensation sensor being positioned to be responsive to the airflow thereacross and having a heat loss least essentially not affected by the presence of liquid water or ice water in the airflow thereacross;

a first controller means associated with each of the first sensor, second sensor, third sensor and compensation sensor, each of which for maintaining the temperature of the respective sensors at respective temperature values using the respective sensors' temperature dependent resistance characteristic, wherein, for each of the first, second and third sensors, the means maintains the sensor at the temperature value by adjusting a power level fed to the sensor and calculates the total power required to maintain the sensor at the temperature value when said sensor is exposed to an airflow comprising at least ice water; and a second controller means for:

receiving power levels from each of the first sensor and second sensor;

subtracting, from each total power calculation, a dry power component determined from the power required to maintain the compensation sensor at its temperature value in the presence of the airflow comprising at least ice water, thereby arriving at a wet power value attributable to an incremental power associated with maintaining the respective first, second and third sensors at the respective temperature values in the presence of at least ice water in the airflow; and calculating a water content measurement for the first sensor, second sensor and third sensor wet power values, selecting a higher water content value from the first and second sensor and subtracting the higher value from the water content value of the third sensor to indicate a presence of ice water.

17. A method for determining a measure of liquid water droplet size based on sensor cooling by cloud water and stored sensor power ratio and droplet size data, utilizing a system comprising a first and second temperature controlled co-located self heated sensors, the cooling of said sensors being substantially independent of ice water, a self heated compensation sensor oriented to be substantially independent of cloud water cooling; a variable power source coupled to each of the first and second sensors for keeping each sensor at a predetermined temperature and each variable power source having an output power; and a variable power source coupled to the compensation sensor for keeping the sensor at a predetermined temperature and having an output power, wherein the method comprises the steps of:

correcting a measured power to each of the first and second sensors to reflect only heat loss due to cloud water by subtracting from the measured power to each of the first and second sensors adjusted compensation sensor measured values; and forming a ratio of corrected power of each of the first and second sensors to identify a liquid water droplet size based on the stored sensor power ratio and droplet size data.

18. A method of measuring water droplet size in an airflow due to passing through a cloud, utilizing a system comprising a sensor head comprising a first heated sensor having a resistance characteristic that is temperature dependent, wherein power loss from the sensor is at least essentially not affected by the presence of ice water in the airflow thereacross; a second heated sensor having a second resistance characteristic that is temperature dependent, wherein power loss from the second sensor is at least essentially not affected by the presence of ice water in the airflow thereacross; a heated compensation sensor being positioned to be responsive to the airflow thereacross and having a power loss at least essentially not affected by the presence of liquid water or ice water in the airflow thereacross, wherein the method comprises the steps of:

maintaining the temperature of the respective sensors at respective temperature values using the respective sensors' temperature dependent resistance characteristic; and wherein, for each of the first and second sensors, the method comprises the steps of maintaining the sensor at the temperature value by adjusting a power level fed to the sensor and calculating the total power required to maintain the sensor at the temperature value when said sensor is exposed to an airflow comprising at least one of liquid water and ice water; wherein the method further comprises the steps of:

receiving power levels from each of the first sensor and second sensor;

subtracting, from each total power calculation, a dry power component determined from the power required to maintain the compensation sensor's temperature value in the presence of the airflow comprising at least liquid water, thereby arriving at a wet power value attributable to an incremental power associated with maintaining the respective first and second sensors at the respective temperature values in the presence of at least liquid water in the airflow; and forming a ratio of the wet power value of the first sensor to the wet power value of the second sensor to obtain an estimated value of the measure of water droplet size in the cloud from a predetermined calibrated relationship of wet power ratios to water droplet sizes.

19. A method for determining liquid water content in an airflow, utilizing a system comprising a sensor head comprising a first heated sensor having a first resistance characteristic that is temperature dependent, wherein the first sensor is at least essentially not affected by the presence of ice water in an airflow thereacross; a second heated sensor having a second resistance characteristic that is temperature dependent, wherein the second sensor is at least essentially not affected by the presence of ice water in the airflow thereacross; a heated compensation sensor being positioned to be responsive to the airflow thereacross and at least essentially not affected by the presence of liquid water or ice water in the airflow thereacross; wherein the method comprises the steps of:

maintaining the temperature of the respective sensors at respective temperature values using the respective sensors' temperature dependent resistance characteristic, maintaining the sensors at the temperature value by adjusting a power level fed to the sensor;

calculating the total power required to maintain the sensor at the temperature value when said sensor is exposed to an airflow comprising at least liquid water;

receiving power levels from each of the first sensor and second sensor;

subtracting, from each total power calculation, a dry power component determined from the power required to maintain the compensation sensor's temperature value in the presence of the airflow thereby arriving at a wet power value attributable to an incremental power associated with maintaining the respective first and second sensors at the respective temperature values in the presence of at least liquid water in the airflow; and calculating a liquid water content for the first and second sensor wet power values and selecting a higher LWC as the determined liquid water content.

20. A method for determining liquid water content in an airflow, said liquid water having a determined droplet size, utilizing a system comprising a sensor head comprising a first heated sensor having a first resistance characteristic that is temperature dependent, wherein the first sensor is at least essentially not affected by the presence of ice water in an airflow thereacross; a second heated sensor having a second resistance characteristic that is temperature dependent, wherein the second sensor is at least essentially not affected by the presence of ice water in the airflow thereacross; a heated compensation sensor being positioned to be responsive to the airflow thereacross and at least essentially not affected by the presence of liquid water or ice water in the airflow thereacross; wherein the method comprises the steps of:

maintaining the temperature of the respective sensors at respective temperature values using the respective sensors' temperature dependent resistance characteristic and, for each of the first and second sensors, maintaining maintains the sensor at the temperature value by adjusting a power level fed to the sensor and calculating the total power required to maintain the sensor at the temperature value when said sensor is exposed to an airflow comprising at least liquid water;

wherein the method further comprises the steps of:

receiving power levels from each of the first sensor and second sensor and having a stored droplet size verses liquid water content correction curve for each first and second sensor;

subtracting, from each total power calculation, a dry power component determined from the power required to maintain the compensation sensor's temperature value in the presence of the airflow thereby arriving at a wet power value attributable to an incremental power associated with maintaining the respective first and second sensors at the respective temperature values in the presence of liquid water in the airflow; and calculating a liquid water content value for the first sensor and second sensor wet power values, selecting the higher of the calculated liquid water content values, and correcting the higher values using a droplet size verses liquid water content correction curve.

21. A method for determining the presence of ice water in an airflow, utilizing a system comprising a sensor head comprising a first heated sensor having a first resistance characteristic that is temperature dependent, wherein heat from the first sensor is at least essentially not affected by the presence of ice water in the airflow thereacross; a second heated sensor having a second resistance characteristic that is temperature dependent, wherein heat from the second sensor is at least essentially not affected by the presence of ice water in the airflow thereacross; a third heated sensor having a third resistance characteristic that is temperature dependent, wherein heat loss from the third sensor is affected by a presence of ice water in the airflow thereacross; a heated compensation sensor being positioned to be responsive to the airflow thereacross and having a heat loss least essentially not affected by the presence of liquid water or ice water in the airflow thereacross; wherein the method comprises the steps of:

maintaining the temperature of the respective sensors at respective temperature values using the respective sensors' temperature dependent resistance and wherein, for each of the first, second and third sensors, maintaining the sensor at the temperature value by adjusting a power level fed to the sensor and calculating the total power required to maintain the sensor at the temperature value when said sensor is exposed to an airflow comprising at least ice water;

wherein the method further comprises the steps of:

receiving power levels from each of the first sensor and second sensor;

subtracting, from each total power calculation, a dry power component determined from the power required to maintain the compensation sensor's temperature value in the presence of the airflow comprising at least ice water, thereby arriving at a wet power value attributable to an incremental power associated with maintaining the respective first, second and third sensors at the respective temperature values in the presence of at least ice water in the airflow; and calculating a water content measurement for the first sensor, second sensor and third sensor wet power values, selecting a higher water content value from the first and second sensor and subtracting the higher value from the water content value of the third sensor to indicate a presence of ice water.

22. A method of warning of being in a cloud using at least one temperature controlled self heated sensor and a variable power source for the at least one sensor having an output power responsive to changes in cloud water, wherein the method comprises the steps of:

forming an average of output power values of the power source;

subtracting a substantially instantaneous measure of the output power of the power source to determine fluctuations around said average; and comparing said fluctuations to a threshold associated with the at least one sensor indicative of the presence of cloud water and indicating when the threshold is exceeded.

* * * * *